(12) United States Patent
Kim et al.

(10) Patent No.: US 12,619,383 B2
(45) Date of Patent: May 5, 2026

(54) INLINE COMPUTATIONAL STORAGE

(71) Applicant: Samsung Electronics Co., Ltd., Suwon-si (KR)

(72) Inventors: Jonghyeon Kim, San Jose, CA (US); Soogil Jeong, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 132 days.

(21) Appl. No.: 18/513,498

(22) Filed: Nov. 17, 2023

(65) Prior Publication Data

US 2025/0060905 A1 Feb. 20, 2025

Related U.S. Application Data

(60) Provisional application No. 63/532,669, filed on Aug. 14, 2023.

(51) Int. Cl.
G06F 3/06 (2006.01)

(52) U.S. Cl.
CPC .......... G06F 3/0659 (2013.01); G06F 3/0604 (2013.01); G06F 3/0656 (2013.01); G06F 3/0673 (2013.01)

(58) Field of Classification Search
CPC ...... G06F 3/0679; G06F 3/0604; G06F 3/061; G06F 3/0625; G06F 3/0656; G06F 3/0658; G06F 3/0659; G06F 3/0673; G06F 9/4482; G06F 9/544; G06F 2212/1016; G06F 2212/1028
See application file for complete search history.

(56) References Cited

U.S. PATENT DOCUMENTS

| | | | |
|---|---|---|---|
| 9,389,804 B2 | 7/2016 | Kim et al. | |
| 9,417,998 B2 | 8/2016 | Mylly et al. | |
| 9,996,479 B2 | 6/2018 | Lea | |
| 11,281,602 B1 | 3/2022 | Iyer et al. | |
| 11,366,610 B2 | 6/2022 | Mizrahi | |
| 11,513,977 B2 | 11/2022 | Kang et al. | |
| 11,645,011 B2 | 5/2023 | Lee et al. | |
| 2011/0093662 A1* | 4/2011 | Walker .................. G06F 3/0659 711/147 |

(Continued)

FOREIGN PATENT DOCUMENTS

| | | |
|---|---|---|
| EP | 4105771 A1 | 12/2022 |
| EP | 4155895 A1 | 3/2023 |

OTHER PUBLICATIONS

European Office Action for Application No. 24194054.3, mailed Apr. 17, 2025.

(Continued)

*Primary Examiner* — Tracy C Chan
(74) *Attorney, Agent, or Firm* — Renaissance IP Law Group LLP

(57) ABSTRACT

A computational storage unit is disclosed. The computational storage unit may include a storage for a data and a controller to read the data from the storage. The computational storage unit may also include a computational engine to implement a function to process the data and generate a result. The computational storage unit may receive a command from a host processor and read the data from the storage, execute the function to process the data and generate the result, and return the result to the host processor based at least in part on the command.

18 Claims, 13 Drawing Sheets

(56)     References Cited

U.S. PATENT DOCUMENTS

| | | | |
|---|---|---|---|
| 2015/0046660 A1* | 2/2015 | Kim | G06F 12/0833 |
| | | | 711/146 |
| 2017/0060588 A1* | 3/2017 | Choi | G06F 15/80 |
| 2017/0344301 A1* | 11/2017 | Ryu | G06F 15/785 |
| 2018/0167268 A1 | 6/2018 | Liguori et al. | |
| 2020/0294558 A1* | 9/2020 | Yu | G11C 11/409 |
| 2021/0096760 A1 | 4/2021 | Cho et al. | |
| 2021/0278998 A1 | 9/2021 | Li | |
| 2022/0300207 A1 | 9/2022 | Tsuji et al. | |
| 2023/0024949 A1 | 1/2023 | Ammari et al. | |
| 2023/0084539 A1 | 3/2023 | Lee et al. | |
| 2024/0419330 A1* | 12/2024 | Dutu | G06F 15/7821 |

OTHER PUBLICATIONS

European Office Action for Application No. 24194054.3, mailed Feb. 10, 2025.
European Extended Search Report for Application No. 24194054.3, mailed Nov. 14, 2024.
European Office Action for Application No. 24194054.3, mailed Jun. 5, 2025.

* cited by examiner

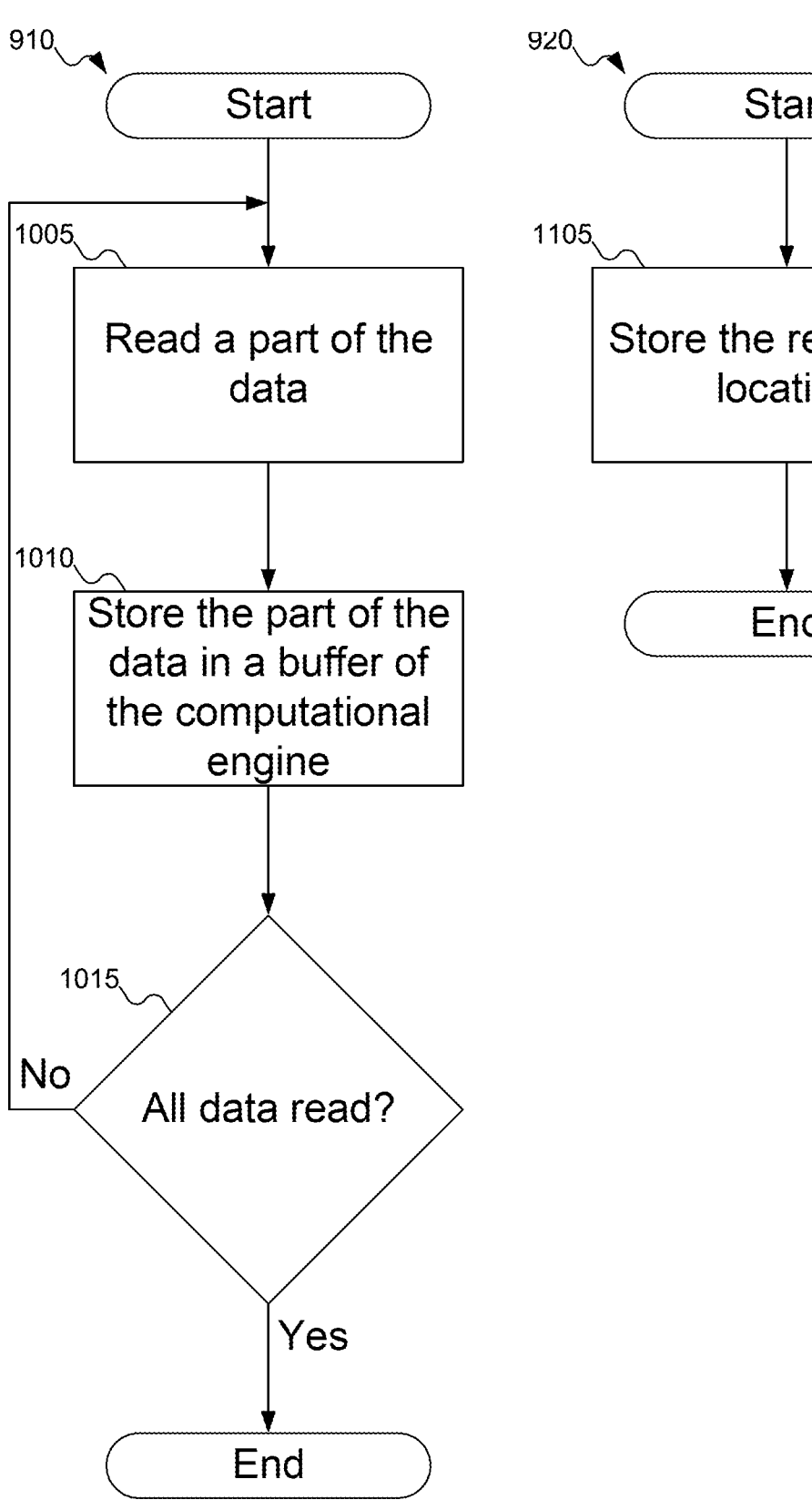
FIG. 10              FIG. 11

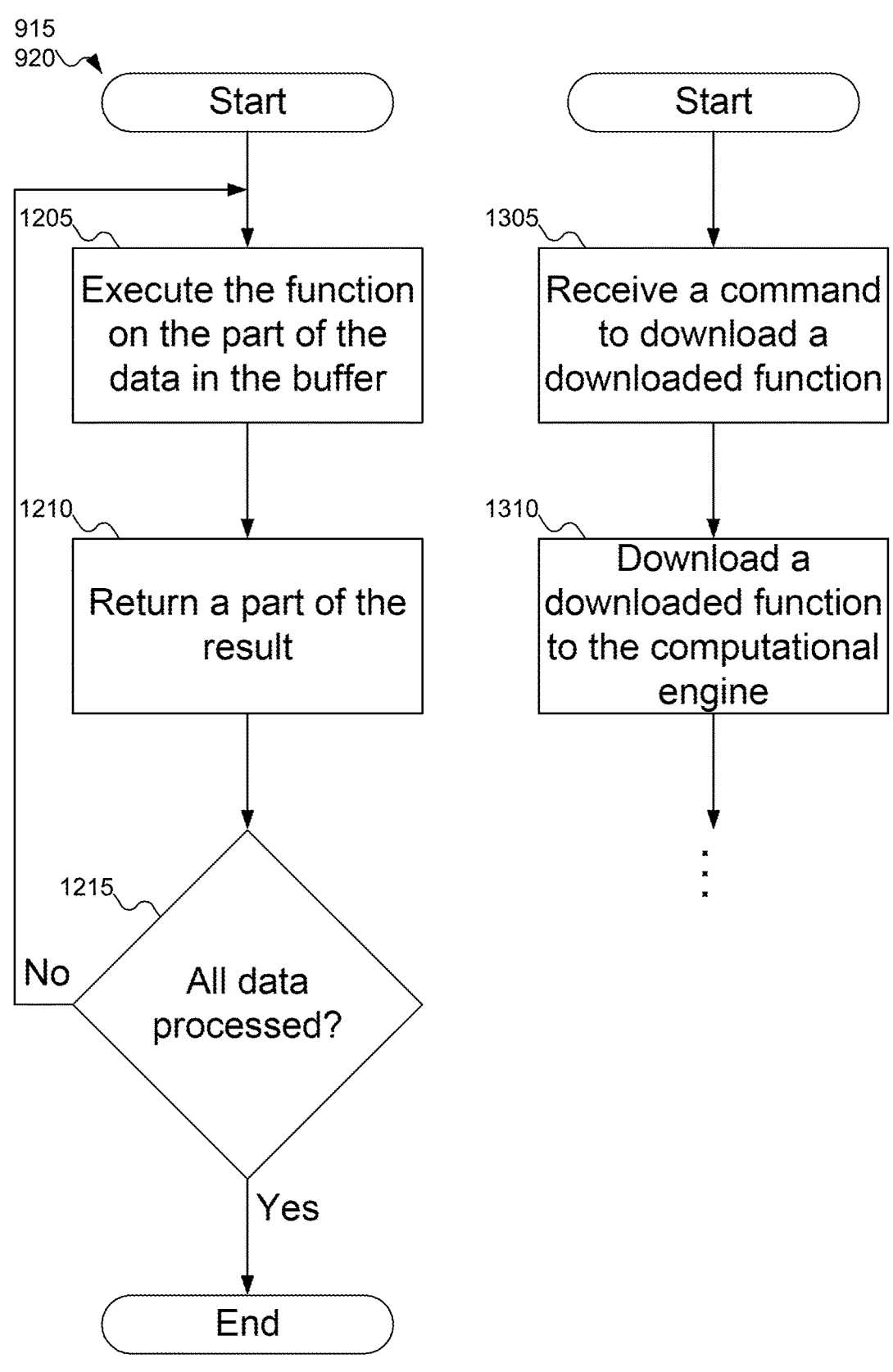
FIG. 12                      FIG. 13

INLINE COMPUTATIONAL STORAGE

RELATED APPLICATION DATA

This application claims the benefit of U.S. Provisional Patent Application Ser. No. 63/532,669, filed Aug. 14, 2023, which is incorporated by reference herein for all purposes.

FIELD

The disclosure relates generally to storage devices, and more particularly to processing of data using a storage device.

BACKGROUND

With the increase in capacity offered by storage devices, applications may process more and more data. Transferring large amounts of data from the storage device to main memory for an application to process may require significant amounts of time. In addition, having the host processor execute the commands to process that data may impose a burden on the host processor.

A need remains to support processing data without burdening the host processor.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 10 shows a flowchart of an example procedure for the computational storage unit of FIG. 1 to read parts of the data and store the parts in the buffer of FIG. 5, according to embodiments of the disclosure.

FIG. 11 shows a flowchart of an example procedure for the computational storage unit of FIG. 1 to store a result of the data processing, according to embodiments of the disclosure.

FIG. 12 shows a flowchart of an example procedure for the computational storage unit of FIG. 1 to execute a function on parts of the data of FIG. 7 and return parts of the result of FIG. 6 to the host processor of FIG. 1, according to embodiments of the disclosure.

FIG. 13 shows a flowchart of an example procedure for the computational storage unit of FIG. 1 to download a function from the host processor of FIG. 1, according to embodiments of the disclosure.

SUMMARY

Figure 1:
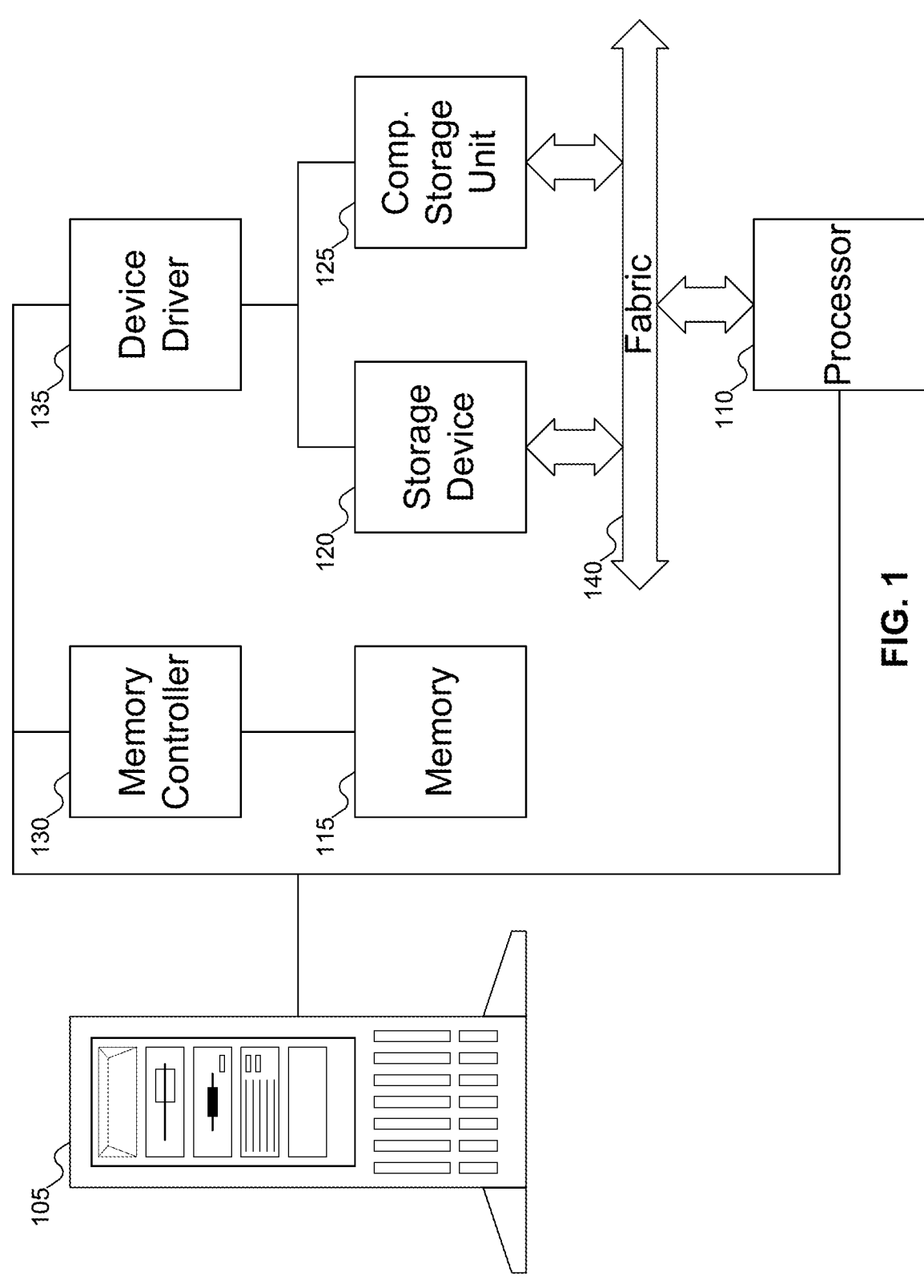
FIG. 1 shows a machine including a computational storage unit to process data using a function, according to embodiments of the disclosure.

A computational storage unit may include storage, a controller, and a computational engine. The computational storage unit may receive a command from a host processor and read data from the storage, execute a function on the data using the computational engine, and return a result to the host processor.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices continue to grow in size, storing more and more data. Processing data using the host processor may require transferring larger and larger amounts of data between the storage device and the host memory, and may require more processing cycles from the host processor to process. There is an inherent latency or delay associated with transferring data from a storage device into the host memory, which may further delay the amount of time needed to process the data using the host processor. In addition, the time the host processor spends processing the data is time that might be used for other operations by the host processor.

Embodiments of the disclosure address these problems by including a computational engine with the storage device. The computational engine may process data nearer to the storage device, thereby both eliminating the time needed to transfer the data from the storage device to host memory, and freeing the host processor to perform other processing.

In embodiments of the disclosure, the host may issue a single command. This command may specify where the data to be processed is stored on the storage device (for example, a logical address of the data and its size), the command to be executed on the data (which may be built into the computational engine or a program downloaded into the computational engine; the command may also include any parameters applicable to the command), and a location where the results may be written (for example, in a register of the host processor or an address in the host memory).

The storage device may then read the data from the location and deliver the data to a buffer in the computational engine. If the buffer is not large enough to store all the data, the buffer may be treated like a queue: data may be placed in the buffer as it is read from the storage device, and the computational engine may "remove" the data from the buffer as it is processed. (Note that the computational engine might leave the data in place in the buffer but mark it as processed, so that new data may overwrite the data that has been processed without actually deleting the processed data.) In this manner, the command may begin processing data before all the data has been read from the storage device.

As results are produced, the results may be written to the location specified in the command. In this manner, results may be delivered "on-the-fly" or "inline" to the host processor with the execution of the command.

FIG. 1 shows a machine including a computational storage unit to process data using a function, according to embodiments of the disclosure. Machine 105, which may also be referred to as a host, may include processor 110, memory 115, storage device 120, and computational storage unit 125. Processor 110 may be any variety of processor. (Processor 110, along with the other components discussed below, are shown outside the machine for case of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 130. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 135. Storage device 120 may be associated with a computational storage unit 125. As discussed below with reference to FIGS. 3A-3D, computational storage unit 125 and storage device 120 may be designed and manufactured as a single integrated unit, or computational storage unit 125 may be separate from storage device 120. The phrase "associated with" is intended to cover describe both a single integrated unit including both a storage device and a computational storage unit and a storage device that is paired with a computational storage unit but that are not manufactured as a single integrated unit. In other words, a storage device and a computational storage unit may be said to be "paired" when they are physically separate devices but are connected in a manner that enables them to communicate with each other. Further, in the remainder of this document, any reference to storage device 120 and/or computational storage unit 125 may be understood to refer to the devices either as physically separate but paired (and therefore may include the other device) or to both devices integrated into a single component.

In addition, the connection between the storage device and the paired computational storage unit might enable the two devices to communicate, but might not enable one (or both) devices to work with a different partner: that is, the storage device might not be able to communicate with another computational storage unit, and/or the computational storage unit might not be able to communicate with another storage device. For example, the storage device and the paired computational storage unit might be connected serially (in either order) to the fabric, enabling the computational storage unit to access information from the storage device in a manner another computational storage unit might not be able to achieve.

While FIG. 1 uses the generic term "storage device", embodiments of the disclosure may include any storage device formats that may be associated with computational storage, examples of which may include hard disk drives and Solid State Drives (SSDs). Any reference to "SSD" below should be understood to include such other embodiments of the disclosure.

Processor 105, storage device 120, and computational storage unit 125 are shown as connecting to fabric 140. Fabric 140 is intended to represent any fabric along which information may be passed. Fabric 140 may include fabrics that may be internal to machine 105, and which may use interfaces such as Peripheral Component Interconnect Express (PCIe), Serial AT Attachment (SATA), Small Computer Systems Interface (SCSI), among others. Fabric 140 may also include fabrics that may be external to machine 105, and which may use interfaces such as Ethernet, Infiniband, or Fibre Channel, among others. In addition, fabric 140 may support one or more protocols, such as Non-Volatile Memory Express (NVMe), NVMe over Fabrics (NVMe-oF), or Simple Service Discovery Protocol (SSDP), among others. Thus, fabric 140 may be thought of as encompassing both internal and external networking connections, over which commands may be sent, either directly or indirectly, to storage device 120 (and more particularly, the computational storage unit associated with storage device 120). In embodiments of the disclosure where fabric 140 supports external networking connections, storage device 120 and/or computational storage unit 125 might be located external to machine 105.

FIG. 1 shows processor 105, storage device 120, and computational storage unit 125 as being connected to fabric 140 because processor 105, storage device 120, and computational storage unit 125 may communicate via fabric 140. In some embodiments of the disclosure, storage device 120 and/or computational storage unit 125 may include a connection to fabric 120 that may include the ability to communicate with a remote machine and/or a network: for example, a network-capable Solid State Drive (SSD). But in other embodiments of the disclosure, while machine 105 may include a connection to another machine and/or a network (which connection may be considered part of fabric 140), storage device 120 and/or computational storage unit 125 might not be connected to another machine and/or network. In such embodiments of the disclosure, storage device 120 and/or computational storage unit 125 may still be reachable from a remote machine, but such commands may pass through processor 110, among other possibilities, to reach storage device 120 and/or computational storage unit 125.

Figure 2:
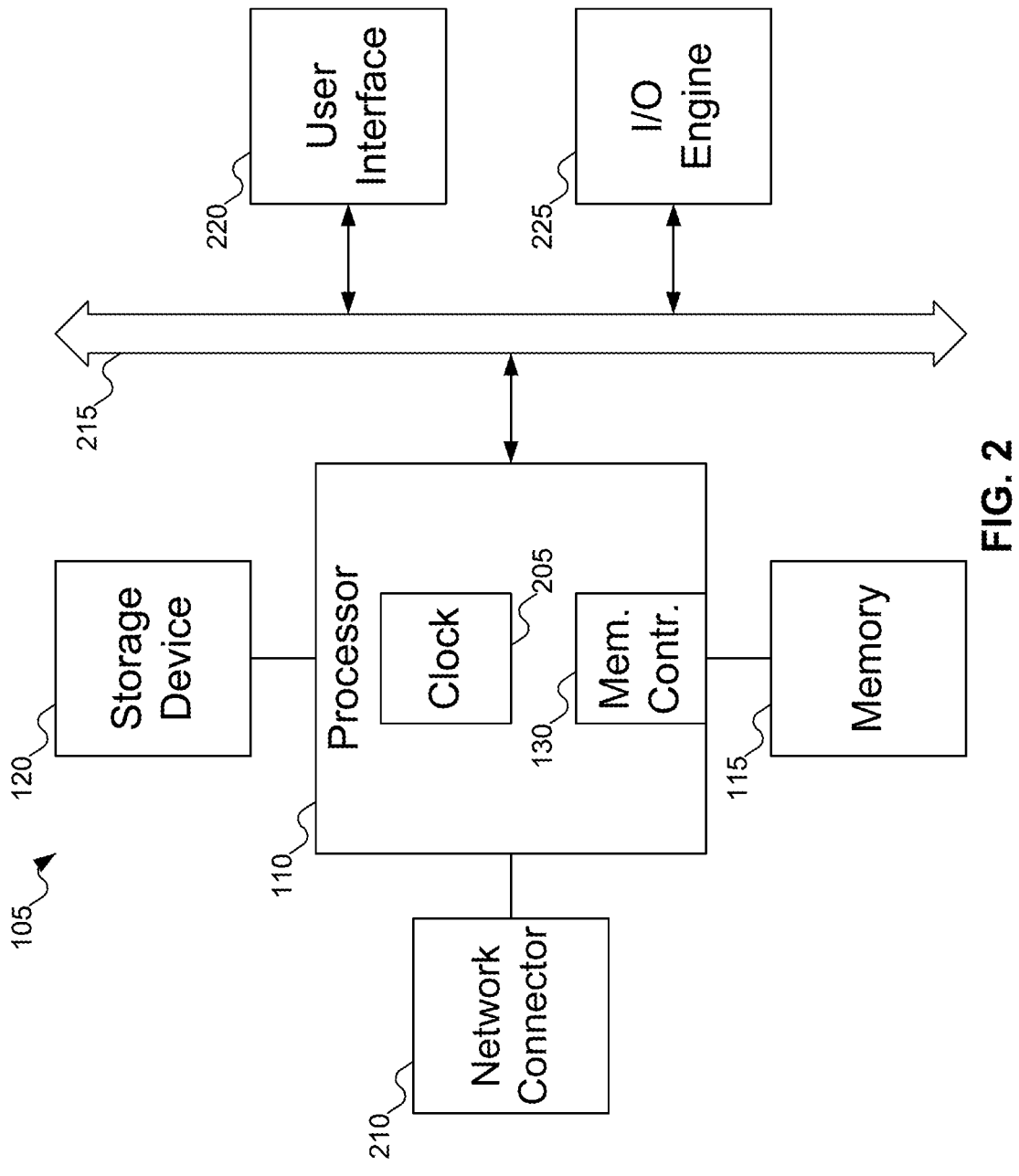
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 130 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
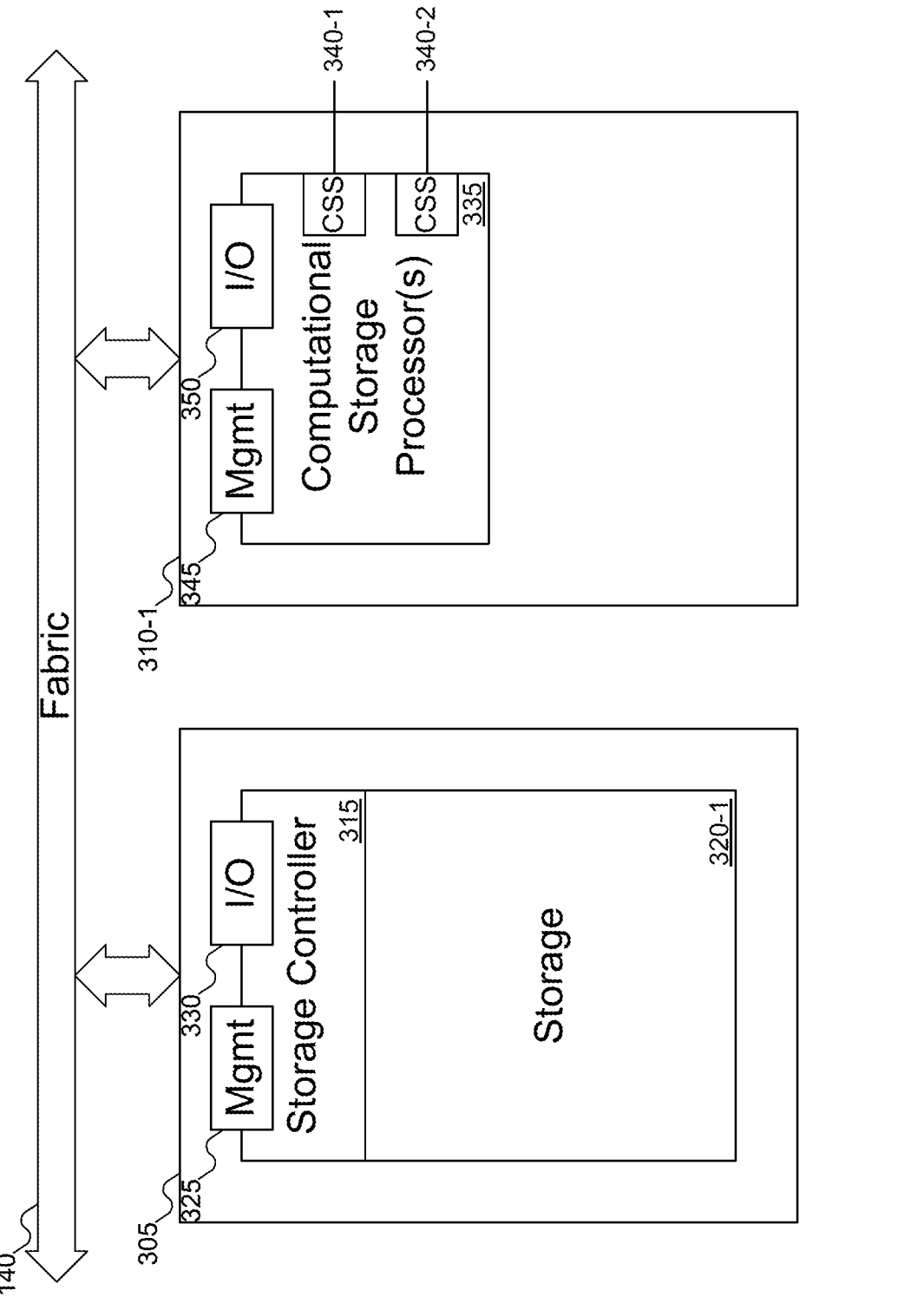
FIG. 3A shows a first example arrangement of the computational storage unit of FIG. 1 that may be associated with the storage device of FIG. 1, according to embodiments of the disclosure.

FIGS. 3A-3D show various arrangements of computational storage unit 125 of FIG. 1 that may be associated with storage device 120 of FIG. 1, according to embodiments of the disclosure. In FIG. 3A, storage device 305 and computational device 310-1 (which may be termed merely a "device") are shown. Storage device 305 may include controller 315 and storage 320-1. Storage device 305 may be reachable using any desired form of access. For example, in FIG. 3A, storage device 305 may be accessed across queue pairs: management queue pair 325 may be used for management of storage device 305, and I/O queue pair 330 may be used to control I/O of storage device 305. Embodiments of the disclosure may include any number (one or more) of queue pairs 325 and 330 (or other forms of access), and access may be shared: for example, a single queue pair may be used both for management and I/O control of storage device 305 (that is, queue pairs 325 and 330 may be combined in one queue pair).

Computational device 310-1 may be paired with storage device 305. Computational device 310-1 may include any number (one or more) processors 335, which may also be referred to as computational engines or engines, and which may offer one or more services 340-1 and 340-2, which may be referred to collectively as services 340. To be clearer, each processor 335 may offer any number (one or more) services 340 (although embodiments of the disclosure may include computational device 310-1 including exactly two services 340-1 and 340-2). Services 340 may be functions that are built into processors 335, functions downloaded from processor 110 of FIG. 1 (that is, custom functions that processor 110 of FIG. 1 wants supported by processors 335), or both. Computational device 310-1 may be reachable across management queue pair 345 and I/O queue pair 350, which may be used for management of computational device 310-1 and/or to control I/O of computational device 310-1, similar to queue pairs 325 and 330 for storage device 305. Like queue pairs 325 and 330, other forms of access may be used, and a single queue pair may be used both for management and I/O control of computational device 310-1 (that is, queue pairs 345 and 350 may be combined in one queue pair).

Processors 335 may be thought of as near-storage processing: that is, processing that is closer to storage device 305 than processor 110 of FIG. 1. Because processors 335 are closer to storage device 305, processors 335 may be able to execute commands on data stored in storage device 305 more quickly than for processor 110 of FIG. 1 to execute such commands. While not shown in FIG. 3A, processors 335 may have associated memory which may be used for local execution of commands on data stored in storage device 305, as discussed further with reference to FIG. 5 below.

While FIG. 3A shows storage device 305 and computational device 310-1 as being separately reachable across fabric 140, embodiments of the disclosure may also include storage device 305 and computational device 310-1 being serially connected. That is, commands directed to storage device 305 and computational device 310-1 might both be received at the same physical connection to fabric 140 and may pass through one device to reach the other. For example, if computational device 310-1 is located between storage device 305 and fabric 140, computational device 310-1 may receive commands directed to both computational device 310-1 and storage device 305: computational device 310-1 may process commands directed to computational device 310-1, and may pass commands directed to storage device 305 to storage device 305.

Services 340 may offer a number of different functions that may be executed on data stored in storage device 305. For example, services 340 may offer pre-defined functions, such as encryption, decryption, compression, and/or decompression of data, erasure coding, and/or applying regular expressions. Or, services 340 may offer more general functions, such as data searching and/or SQL functions. Services 340 may also support running application-specific code. That is, the application using services 340 may provide custom code to be executed using data on storage device 305. Table 1 lists some examples of services that may be offered by processors 335.

TABLE 1

| Service Types |
| --- |
| Compression |
| Encryption |
| Database filter |
| Erasure coding |
| Redundant Array of Independent Disks (RAID) |
| Hash/Cyclic Redundancy Check (CRC) |
| Regular Express (RegEx) (pattern matching) |
| Scatter Gather |
| Pipeline |
| Video compression |
| Data Deduplication |
| Operating System Image Loader |
| Container Image Loader |
| Berkeley packet filter (BPF) loader |
| FPGA Bitstream loader |
| Large Data Set |

In some embodiments of the disclosure, services 340 may be stored in "program slots": that is, particular addresses ranges within processors 335. Services 340 may also be any combination of such functions. In other embodiments of the disclosure, computational device 310-1 may include a memory (not shown in FIG. 3A). This memory may be included within computational device 310-1 or may be external to computational device 310-1 and may be connected to computational device 310-1. This memory, whether internal or external to computational device 310-1, may be used to store services 340. That is, processors 335 may execute services 340 from this memory, or may load services 340 from this memory into program slots in processors 335 (and then executed from these program slots).

Processors 335 (and, indeed, computational device 310-1) may be implemented in any desired manner. Example implementations may include a local processor, such as Central Processing Unit (CPU), a Graphics Processing Unit (GPU), a General Purpose GPU (GPGPU), a Data Processing Unit (DPU), and a Tensor Processing Unit (TPU), among other possibilities. Processors 335 may also be implemented using Field Programmable Gate Array (FPGA), an Application-Specific Integrated Circuit (ASIC), or a System-on-a-Chip, among other possibilities. If computational device 310-1 includes more than one processor 335, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 335 may be thought of as a computational storage unit.

Figure 3B:
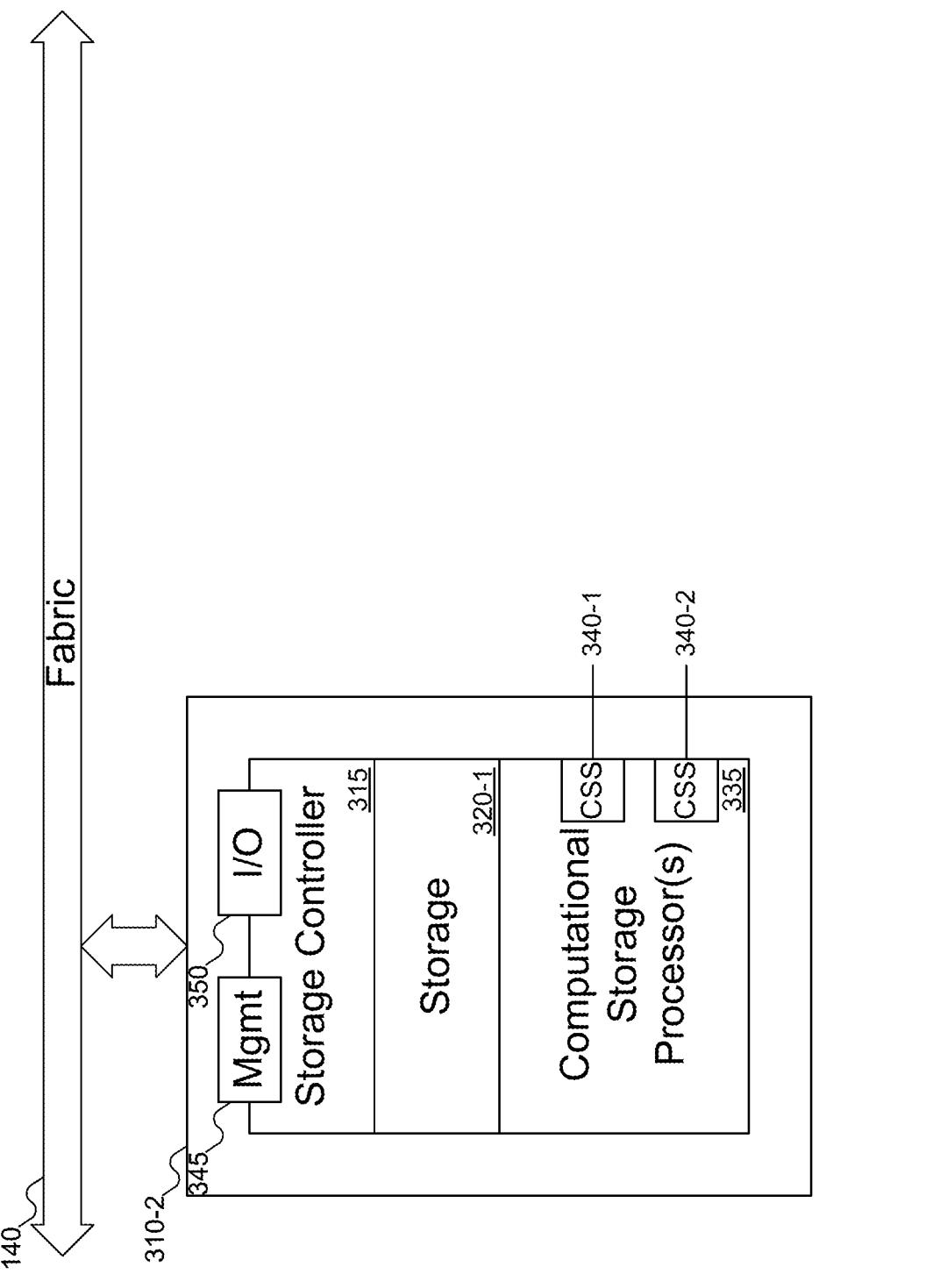
FIG. 3B shows a second example arrangement of the computational storage unit of FIG. 1 that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 335 offering services 340-1 and 340-2. As with storage device 305 and computational device 310-1 of FIG. 3A, management and I/O commands may be received via queue pairs 345. Even though computational device 310-2 is shown as including both storage and processor(s) 335, FIG. 3B may still be thought of as including a storage device that is associated with a computational storage unit.

Figure 3C:
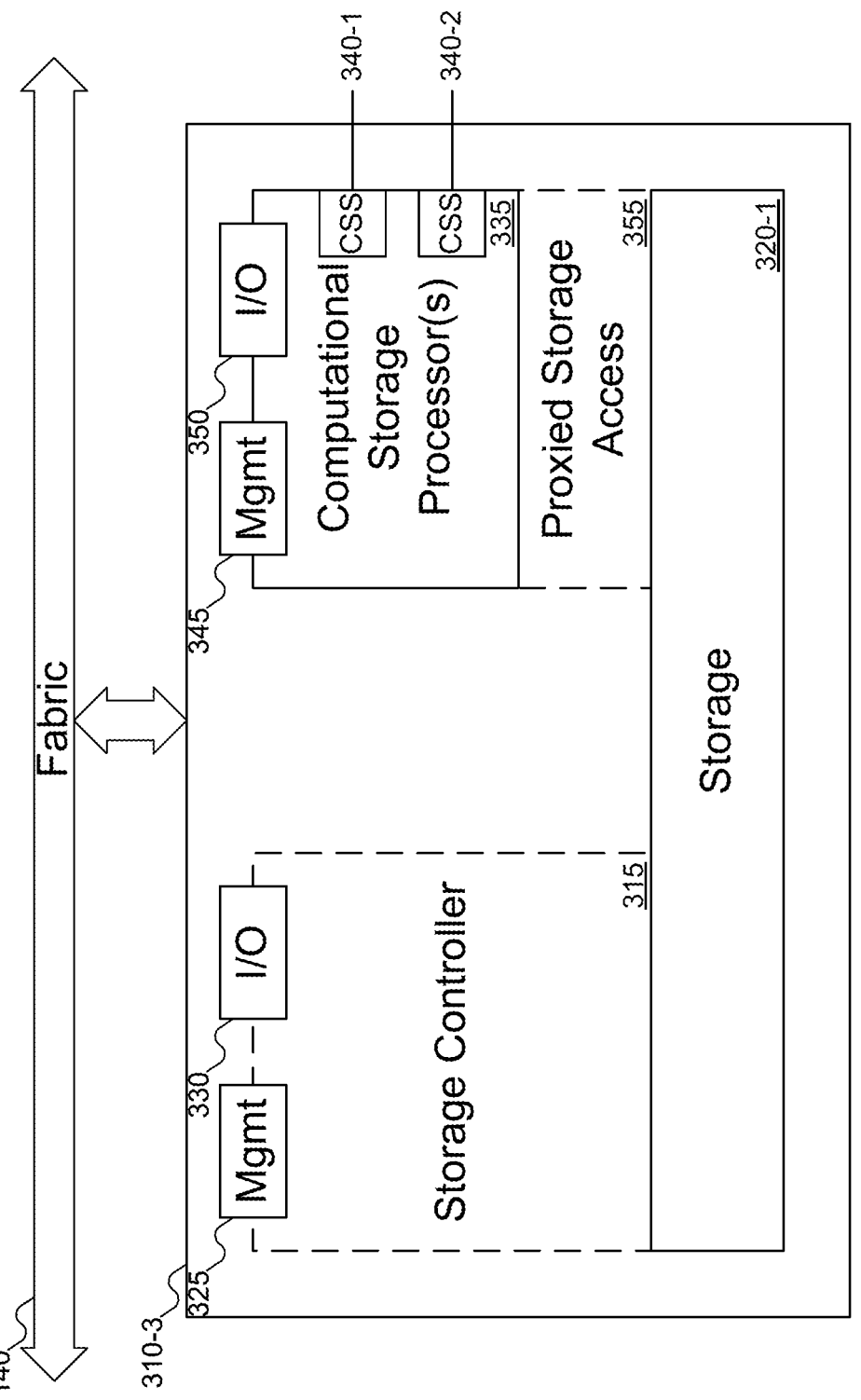
FIG. 3C shows a third example arrangement of the computational storage unit of FIG. 1 that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 335 offering services 340-1 and 340-2. But even though computational device 310-3 may be thought of as a single component including controller 315, storage 320-1, and processor(s) 335 (and also being thought of as a storage device associated with a computational storage unit), unlike the implementation shown in FIG. 3B controller 315 and processor(s) 335 may each include their own queue pairs 325 and 345 (again, which may be used for management and/or I/O). By including queue pairs 325, controller 315 may offer transparent access to storage 320-1 (rather than requiring all communication to proceed through processor(s) 335).

In addition, processor(s) may have proxied storage access 355 to use to access storage 320-1. Thus, instead of routing access requests through controller 315, processor(s) 335 may be able to directly access the data from storage 320-1. Proxied storage access 355 may include, for example, a circuit to access data from storage 320-1 without sending requests to controller 315.

In FIG. 3C, both controller 315 and proxied storage access 355 are shown with dashed lines to represent that they are optional elements, and may be omitted depending on the implementation.

Figure 3D:
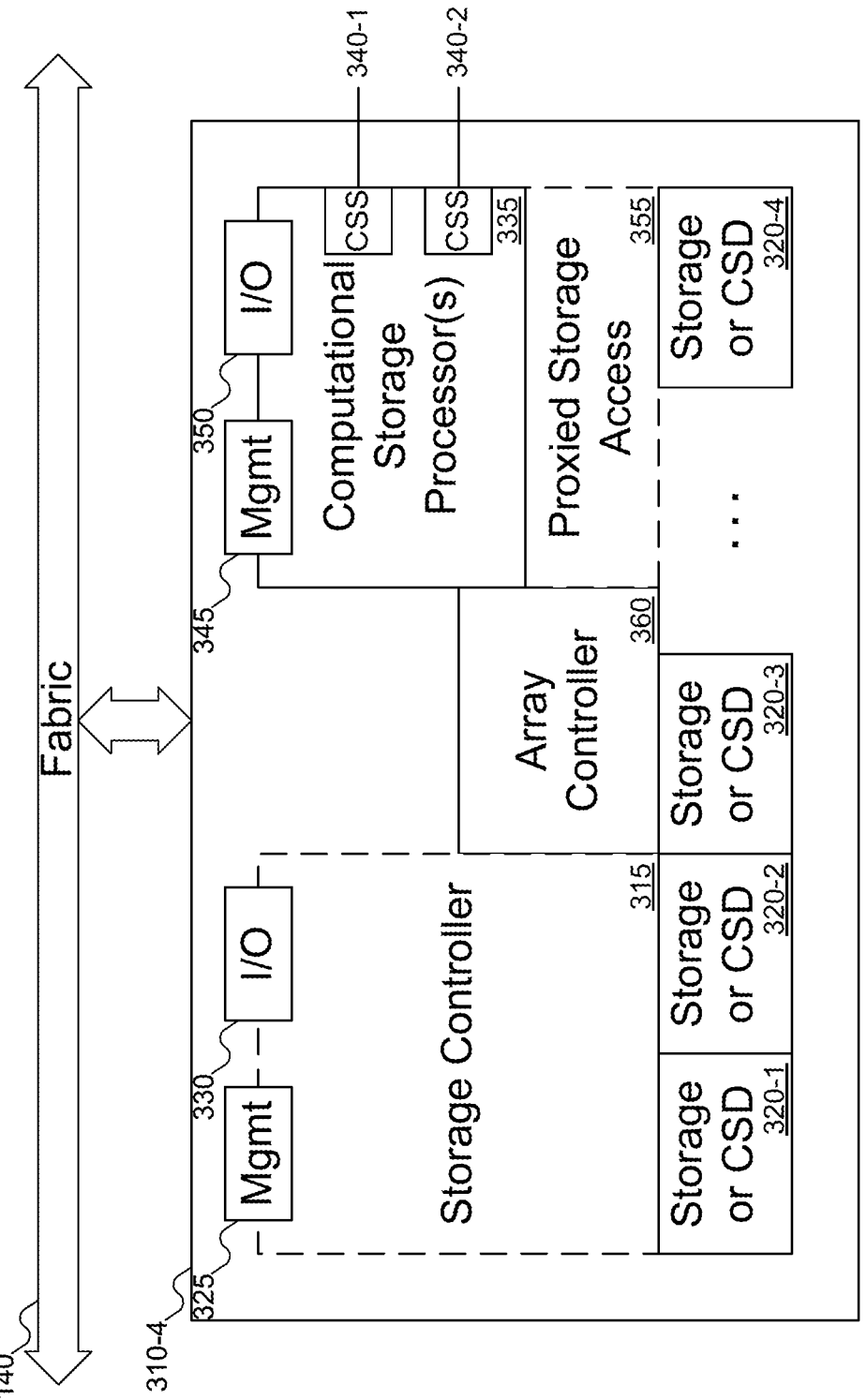
FIG. 3D shows a fourth example arrangement of the computational storage unit of FIG. 1 that may be associated with the storage device of FIG. 1, according to embodiments of the disclosure.

Finally, FIG. 3D shows yet another implementation. In FIG. 3D, computational device 310-4 is shown, which may include an array. Similar to computational device 310-3 of FIG. 3C, the array may include one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 360. Array controller 360 may manage how data is stored on and retrieved from storage elements 320-1 through 320-4. For example, if storage elements 320-1 through 320-4 are implemented as some level of a Redundant Array of Independent Disks (RAID), array controller 360 may be a RAID controller. If storage elements 320-1 through 320-4 are implemented using some form of Erasure Coding, then array controller 360 may be an Erasure Coding controller.

Figure 4:
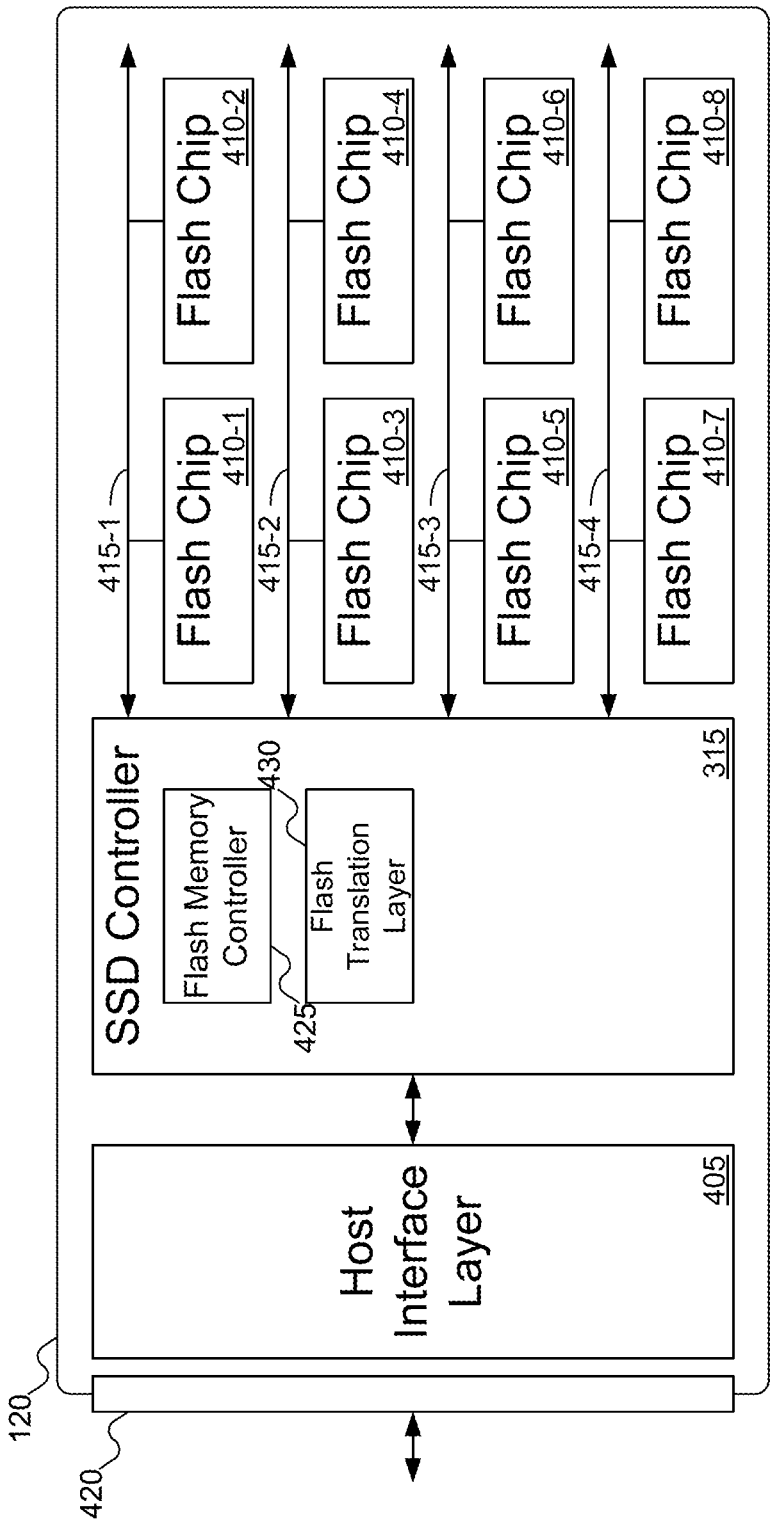
FIG. 4 shows details of the storage device of FIG. 1, according to embodiments of the disclosure.

FIG. 4 shows details of storage device 120 of FIG. 1, according to embodiments of the disclosure. While FIG. 4 focuses on storage device 120 as separate from computational storage unit 125 of FIG. 1, in embodiments of the disclosure where a single integrated element may include both storage device 120 and computational storage 125 of FIG. 1, FIG. 4 may represent only part of the integrated element relevant to storage device 120, with parts relevant to computational storage unit 125 not shown in FIG. 4.

In FIG. 4, the implementation of storage device 120 is shown as for a Solid State Drive (SSD), but embodiments of the disclosure may include other implementations, such as a hard disk drive. In FIG. 4, storage device 120 may include host interface layer (HIL) 405, controller 315, and various flash memory chips 410-1 through 410-8, which may also be referred to as flash memory storage, flash storage, or flash chips and which may be referred to collectively as flash memory chips 410. Flash memory chips 410 may be organized into various channels 415-1 through 415-4, which may be referred to collectively as channels 415. Host interface layer 405 may manage communications between storage device 120 and other components (such as processor 110 of FIG. 1). Host interface layer 405 may also manage communications with devices remote from storage device 120: that is, devices that not part of machine 105 of FIG. 1 but are in communication with storage device 120: for example, over one or more network connections. These communications may include read requests to read data from storage device 120, write requests to write data to storage device 120, and delete requests to delete data from storage device 120.

Host interface layer 405 may manage an interface across only a single port, or it may manage interfaces across multiple ports. Alternatively, storage device 120 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports). Host interface layer 405 may communicate with other components across connection 420, which may be, for example, a PCIe connection, an M.2 connection, a U.2 connection, a SCSI connection, or a SATA connection, among other possibilities.

Controller 315 may manage the read and write operations, along with garbage collection and other operations, on flash memory chips 410 using flash memory controller 425. SSD controller 315 may also include flash translation layer 430. Flash translation layer 430 may manage the mapping of logical block addresses (LBAs) (as used by machine 105 of FIG. 1) to physical block addresses (PBAs) where the data is actually stored on storage device 120. By using flash translation layer 430, host 105 of FIG. 1 does not need to be informed when data is moved from one block to another within storage device 120.

While FIG. 4 shows storage device 120 as including eight flash memory chips 410-1 through 410-8 organized into four channels 415-1 through 415-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

While FIG. 4 shows storage device 120 as being just a storage device, embodiments of the disclosure may include other components within storage device 120. For example, storage device 120 might include, or have associated with it, computational storage unit 125 of FIG. 1, which may support near-data processing. Computational storage unit 125 of FIG. 1 may be used by processor 110 of FIG. 1 to perform various operations.

Figure 5:
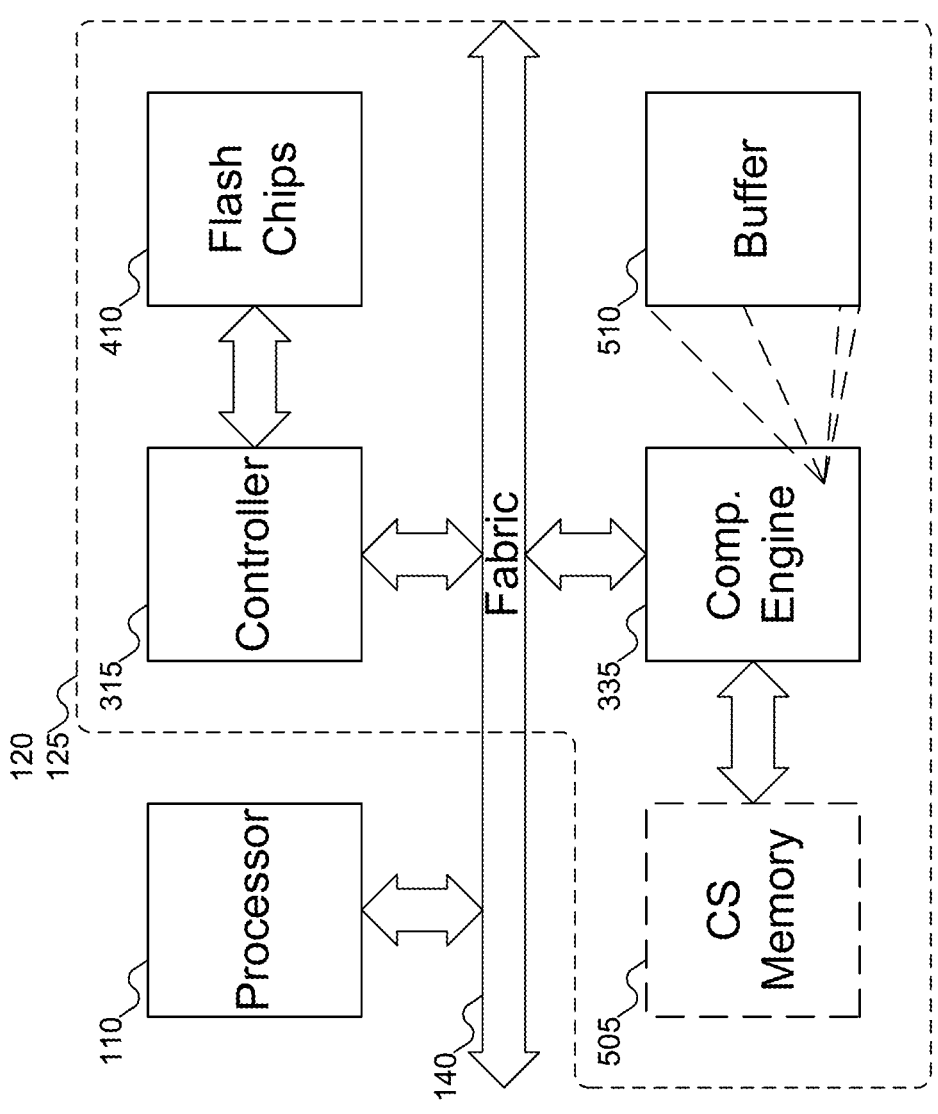
FIG. 5 shows the host processor of FIG. 1 and the computational storage unit of FIG. 1 communicating across the fabric of FIG. 1 to execute a function on data, according to embodiments of the disclosure.

FIG. 5 shows host processor 110 of FIG. 1 and computational storage unit 125 of FIG. 1 communicating across fabric 140 of FIG. 1 to execute a function on data, according to embodiments of the disclosure. FIG. 5 is an alternative view of storage device 120 and computational storage unit 125, which may include other components and described elsewhere herein. In FIG. 5, storage device 120 and computational storage unit 125 are shown as combined into a single integrated element, but as discussed above, embodiments of the disclosure may have storage device 120 and computational storage unit 125 as separate, associated components. For purposes of FIG. 5, any reference to storage device 120 may be understood as also referencing computational storage unit 125.

In FIG. 5, processor 110 may want data stored in flash chips 410 to be processed by computational engine 335, with the results returned to host processor 110. One approach is for host processor 110 to issue a command to transfer the data from flash chips 410 to storage accessible to computational engine 335. For example, computational engine 335 might have access to computational storage memory 505, which may also be part of computational storage unit 125. Computational storage memory 505 may be, for example, DRAM. Computational storage memory 505 may be understood as distinct from host memory 115 of FIG. 1: computational storage memory 505 may be local to computational storage unit 125, as opposed to host memory 115, which may be accessible by any component of machine 105 of FIG. 1. Controller 315 may, in response to this command, transfer (for example, copy) the data from flash chips 410 to computational storage memory 505. Controller 315 (or computational engine 335, depending on which element may communicate with host processor 110) may notify host processor 110 once the data has been transferred from flash chips 410 to computational storage memory 505.

Once the data has been copied from flash chips 410 to computational storage memory 505, host processor 110 may then issue a second command to computational engine 335 to process the data. This command may specify where the data is currently stored in computational storage memory 505, some identifier of the function to be performed on the data, and an location where the result may be stored. Computational engine 335 may, in response to this second command, execute the identified function on the data stored in computational storage memory 505. Once computational engine 335 has finished processing the data in computational storage memory 505, computational engine 335 may then write the result to the indicated location. This location may be, for example, an address in computational storage memory 505 or in flash chips 410. (In some embodiments of the disclosure, this location might also be in host memory 115 of FIG. 1.) Computational engine 335 (or controller 315, depending on which element may communicate with host processor 110) may notify host processor 110 when processing of the data is complete.

Finally, host processor 110 may issue a third command, to transfer the result back to host processor 110. Controller 315 (or computational engine 335, depending on which element may communicate with host processor 110) may then return the result as read from wherever it was stored.

This approach, while functional, may have some problems. First, host processor 110 may issue three commands: one to transfer the data from flash chips 410 to computational storage memory 505, one to process the data, and one to return the result. Three commands may require more time to issue than a single unified (or fused) command.

Second, because host processor 110 issues multiple commands, host processor 110 may wait for one command to complete before issuing the second command. For example, host processor 110 may wait until the data is available in computational storage memory 505 before issuing the command to computational engine 335 to process the data. After all, if the data is not yet available, a command to process the data might result in an error. Similarly, host processor 110 may wait until the result is available before issuing the command to return the result, as a command to return the result may result in an error if the result is not yet available (because computational engine 335 has not yet finished processing the data). Thus, host processor 110 may wait for each command to complete before issuing the next command, adding to the overall time required to complete the sequence.

Third, because host processor 110 may wait until one command completes before issuing the next command, computational storage memory 505 may need to be large enough to store all of the data. For example, if the data is five megabytes (MB) in size, then computational storage memory 505 may need to be at least five MB in size.

Computational storage memory 505 may be expensive. For example, where computational storage memory 505 uses DRAM, the average price for 1 GB of DRAM is approximately $0.43. In contrast, the average price for 1 gigabyte (GB) of flash memory is approximately $0.06, whereas, making DRAM approximately seven times more expensive than flash memory. Thus, the cost to manufacture computational storage unit 125 may increase with the size of computational storage memory 505.

Embodiments of the disclosure may address these problems. First, instead of issuing three separate commands to transfer the data from flash chips 410 to computational storage memory 505, to execute the function on the data, and to return the result, host processor 110 may issue a single command, which may be referred to as a fused compute command or a unified compute command. As a result of this one command, storage device 120 and computational storage unit 125 may read the data from flash chips 410, execute a function on the data, and return a result to host processor 110. Using one command instead of three commands improves on the model described above.

In addition, instead of transferring the data from flash chips 410 to computational storage memory 505, the data may be transferred to buffer 510 of computational engine 335. Buffer 510 may be a local memory that computational engine 335 may use to process data. (Note that in the model described above, computational engine 335 may move data from computational storage memory 505 to buffer 510 for local processing, much as host processor 110 may include a cache that stores local copies of data otherwise stored in, for example, host memory 115 of FIG. 1.) By transferring the data to buffer 510, the time required to write the data to computational storage memory 505 and then to read the data back out of computational storage memory 505 to transfer the data to buffer 510 may be eliminated: the data may be sent directly to buffer 510. Buffer 510 may be implemented using, for example, SRAM or some other form of (relatively) fast storage. By using buffer 510 to store the data instead of computational storage memory 505, computational storage memory may be eliminated, as shown by the dashed lines of computational storage memory 505.

As discussed further below with reference to FIG. 7, buffer 510 might be smaller than computational storage memory 505.

Yet another advantage of embodiments of the disclosure is that computational engine 335 may begin processing data before the entirety of the data is transferred from flash chips 410 to buffer 510. In the model described above where host processor 110 issues one command to transfer data to computational storage memory 505, another command to invoke computational engine 335 to process the data, and a third command to transfer the result back to host processor 110, host processor 110 might not issue the command to begin processing the data until after the data has been transferred from flash chips 410 to computational storage memory 505. But if the data is transferred from flash chips 410 to buffer 510, computational engine 335 may begin processing the data as soon as there is data in buffer 510: computational engine 335 need not wait for all the data to be transferred first. (In fact, as discussed with reference to FIG. 7 below, it might not be possible to transfer the data in its entirety from flash chips 410 into buffer 510, in which case computational engine 335 might not be able to wait until all of the data is transferred into buffer 510.)

Finally, because computational engine 335 may begin processing the data as soon as there is data in buffer 510, computational engine 335 may also begin sending results back to host processor 110 as computational engine 335 processes the data. Just like computational engine 335 may begin processing the data before all the data has been transferred from flash chips 410 to buffer 510, computational engine 335 may also being sending results back to host processor 110 before all the data has been transferred from flash chips 410 to buffer 510. By returning results sooner, host processor 110 may also begin its next processing, rather than waiting until all of the data has been processed by computational engine 335.

Figure 6:
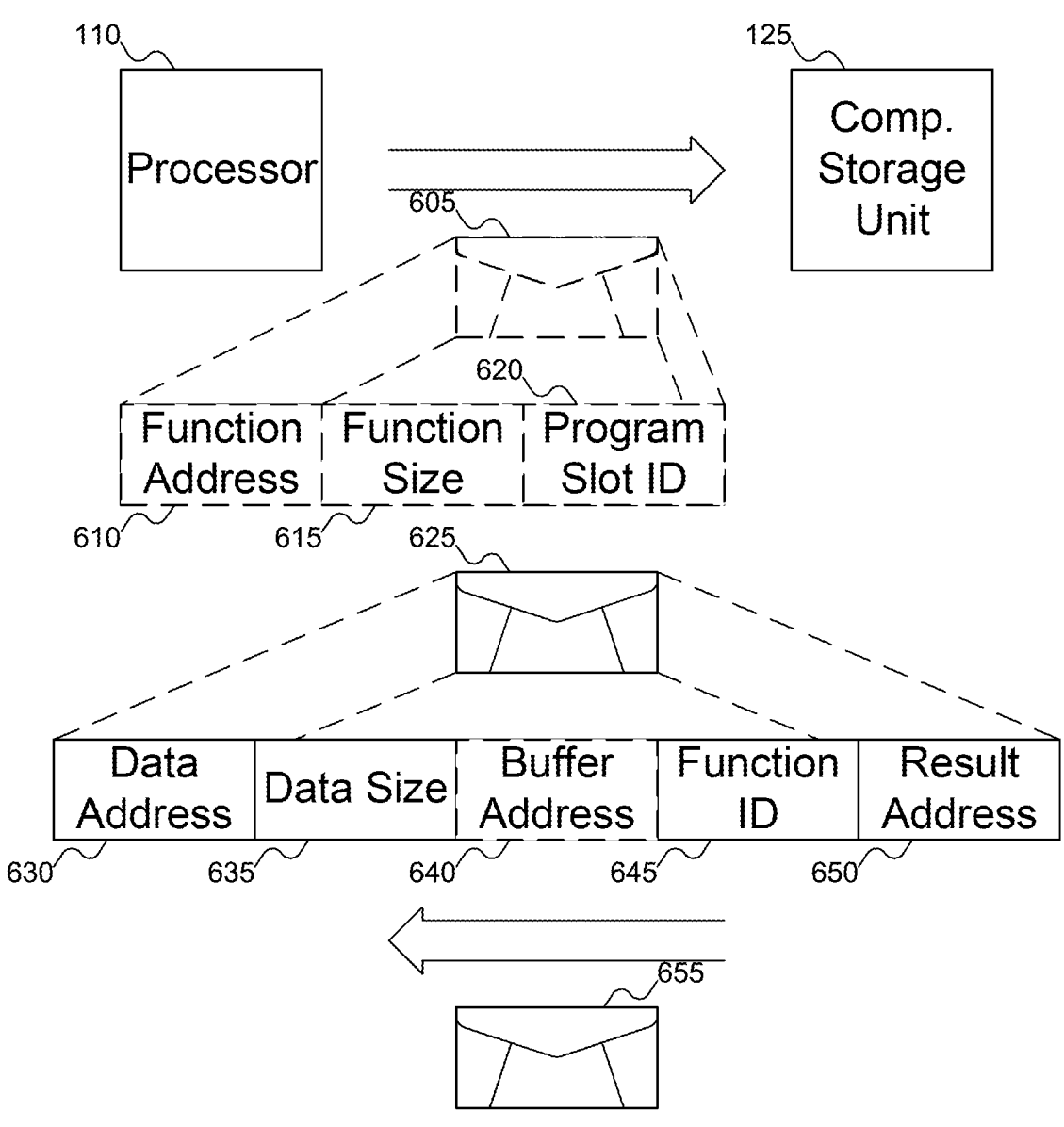
FIG. 6 shows details of commands and a result that may be exchanged between the host processor of FIG. 1 and the computational storage unit of FIG. 1, according to embodiments of the disclosure.

FIG. 6 shows details of commands and a result that may be exchanged between host processor 110 of FIG. 1 and computational storage unit 125 of FIG. 1, according to embodiments of the disclosure. As in FIG. 5, computational storage unit 125 may be combined with storage device 120 into a single integrated unit, or computational storage unit may be separate from but communicating with storage device 120.

In FIG. 6, host processor 110 may send command 605 to computational storage unit 125. Command 605 may be a command to download a function to computational storage unit 125. For example, host processor 110 (or an application running on host processor 110) may include a function that processes the data using a particular algorithm. This function might be custom designed for use with a particular dataset, or this function might be one that may be used with various datasets but for whatever reason is not currently included in computational storage unit 125.

Command 605 may include function address 610, function size 615, and program slot identifier 620. Function address 610 may indicate where the function is currently stored so that it may be downloaded into computational storage unit 125. For example, function address 610 might be an address in host memory 115 of FIG. 1, or a register in host processor 110. Function address 610 might also reference a function stored on storage device 120 of FIG. 1, or even a function stored remote from machine 105 of FIG. 1 (in which case function address 610 might indicate the remote machine storing the function as well as where the function is stored on the remote machine). Function size 615 may specify how large the function code is, so that computational storage unit 125 may determine how much information to read to download the entire function. Finally, program slot identifier 620 may identify a program slot in computational storage unit 620 where the downloaded function may be stored. For example, as discussed above with reference to FIG. 3A, a program slot may be a range of addresses in a local memory of computational storage unit 125: the downloaded function may then be stored in that range of addresses, and may be invoked by identifying the program slot. Other forms of function identification may also be used, depending on how functions may be stored in computational storage unit: for example, each function may be assigned a function identifier rather than being assigned a program slot: computational storage unit 125 may then manage an association between the function (wherever stored in computational storage unit 125) and the function ID.

As discussed above with reference to FIGS. 3A-3D, in some embodiments of the disclosure, computational storage unit 125 may already implement various functions or services. If the function to be applied to the data is already supported by computational storage unit 125, then there might be no need to download a function to computational storage unit 125, and command 605 may be omitted.

Host processor 110 may also send command 625. Command 625 may be a command for computational storage unit

125 to read data, process the data, and return a result, as discussed above with reference to FIG. 5. Command 625 may include data address 630, data size 635, buffer address 640, function identifier 645, and result address 650. Data address 630 may identify an address where the data may be found in storage device 120 of FIG. 1. Data address 630 may be a physical address or a logical address, which storage device 120 may map to a physical address. Data size 635 may indicate how large the data is, so that computational storage unit 125 (or controller 315 of FIGS. 3A-3D) may know how much data to read.

Buffer address 640 may identify a location in buffer 510 of FIG. 5 where the data is to be stored. In some embodiments of the disclosure, host processor 110 may be able to see buffer 510 of FIG. 5 and may therefore know what addresses are assigned to buffer 510 of FIG. 5. In other embodiments of the disclosure, host processor 110 might not be able to see buffer 510 of FIG. 5, in which case computational storage unit 125 may determine what address in buffer 510 of FIG. 5 should store the transferred data: in such embodiments of the disclosure, buffer address 640 may be omitted from command 625. Function identifier 645 may identify the function to be used to process the data. As discussed above, function identifier might just be an identifier that computational storage unit 125 may use to locate the function. For example, if computational storage unit 125 exposes physical or virtual functions to host processor 110, each function to be used to process data might be assigned a particular physical or virtual function number, which may be used to identify the function to be used to process the data. Alternatively, function identifier 645 might reference a program slot where a particular function is stored, in which case computational storage unit 125 may execute the function stored in the identified program slot. Finally, result address 650 may specify where the result of the function should be stored for host processor 110. For example, result address 650 might identify an address in host memory 115 of FIG. 1, a register in host processor 110, or an address on storage device 120 of FIG. 1 where the result should be stored, among other possibilities.

Finally, computational storage unit 125 may send result 655 back to host processor 110. As discussed above, result 655 might not be sent as a message, but rather might be written to result address 650 by computational storage unit 125. Result 655 is meant to show that computational storage unit 125 returns a result back to host processor 110.

As discussed above with reference to FIG. 5, an advantage of embodiments of the disclosure is that additional computational storage memory 505 of FIG. 5 may be omitted by using buffer 510 of FIG. 5 instead. But rather than replacing computational storage memory 505 of FIG. 5 with buffer 510 of FIG. 5, and therefore increasing the size of buffer 510 of FIG. 5, buffer 510 of FIG. 5 may be kept smaller than computational storage memory 505 of FIG. 5 might have been. For example, if computational storage memory 505 of FIG. 5 was used, computational storage unit 125 might need to include approximately 10 MB of DRAM. But buffer 510 of FIG. 5 might be smaller: for example, buffer 510 of FIG. 5 might include only one or two MB of SRAM. But the fact that buffer 510 of FIG. 5 might be smaller than computational storage memory 505 of FIG. 5 might have been does not place a limit on the size of the data. FIG. 7 illustrates how buffer 510 may be smaller than size 635 of FIG. 6 of the data to be processed.

Figure 7:
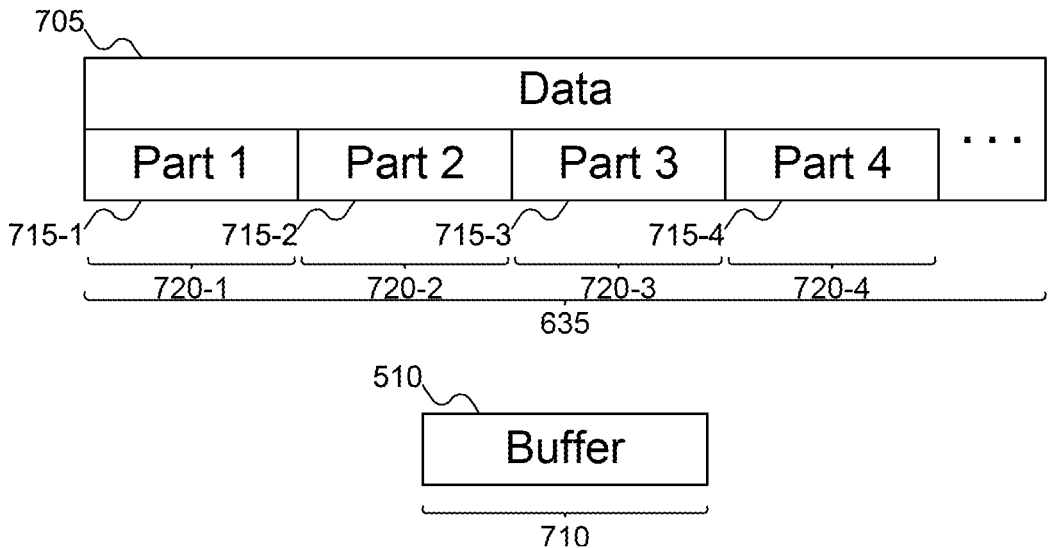
FIG. 7 shows the data broken into parts that may fit in the buffer of FIG. 5, according to embodiments of the disclosure.

FIG. 7 shows the data broken into parts that may fit in buffer 510 of FIG. 5, according to embodiments of the disclosure. In FIG. 7, data 705 is shown. Data 705 is shown as being of size 635, the same as data size 635 of FIG. 6. In contrast, buffer 510 is shown as having size 710. which may be smaller than data size 635. But instead of attempting to store the entirety of data 705 into buffer 510, data 705 may be broken into parts 715-1 through 715-4 (which may be referred to collectively as parts 715). Computational storage unit 125 of FIG. 1 may determine how large each part 715 may be: the size of each part 715 may depend on various factors, such as how data 705 is organized (for example, does data 705 include a database table or a data structure with a fixed size), the size of the smallest manageable portion of data 705 that may be processed (for example, that an entire row in a database table should be processed together), or the size of buffer 510, among other possibilities. Each part 715 of data 705 may have a size, such as sizes 720-1 through 720-4 (which may be referred to collectively as sizes 720) that may be smaller than size 710 of buffer 510. (Note that each part 715 of data 705 might have a different size 720: it is not required that each part 715 of data 705 be the same size. But in some embodiments of the disclosure, each part 715 of data 705 may have the same size 720.) Therefore, buffer 510 may be large enough to store one (or more) of parts 715 of data 705. In the remainder of the discussion of FIG. 7, it is assumed that one part 715 of data 705 may be stored in buffer 510 at a time.

Once part 715 of data 705 has been stored in buffer 510, computational engine 335 of FIGS. 3A-3D may begin processing part 715 of data 705. Note that computational engine 335 of FIGS. 3A-3D may proceed even without all of data 705 being stored in buffer 510: computational engine 335 of FIGS. 3A-3D may process data 705 one part at a time. Once computational engine 335 of FIGS. 3A-3D has processed one part 715 of data 705, another part 715 of data 705 may be transferred to buffer 510, at which point computational engine 335 of FIGS. 3A-3D may process that part 715 of data 705, and so on. In other words, computational engine 335 of FIGS. 3A-3D may proceed to process data 705 in buffer 510 even before all of data 705 has been transferred into buffer 510, and even before all of data 705 has been read from storage device 120 of FIG. 1.

While FIG. 7 shows data 705 as including four parts 715, embodiments of the disclosure may include any number (one or more) of parts 715 of data 705.

Figure 8:
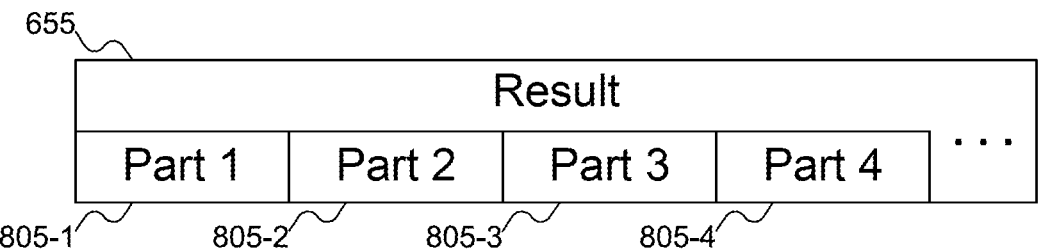
FIG. 8 shows the result of FIG. 6 broken into parts that may fit in the buffer of FIG. 5, according to embodiments of the disclosure.

As computational engine 335 of FIGS. 3A-3D may process data 705 in parts 715, computational engine 335 of FIGS. 3A-3D may produce results. In some embodiments of the disclosure, computational engine 335 of FIGS. 3A-3D may store partial results internally (or at some address in memory 115 of FIG. 1, which might include return address 650 of FIG. 6) until all of data 705 has been processed. Once all the partial results have been produced, computational engine 335 of FIGS. 3A-3D may store a final result 655 of FIG. 6 as specified by result address 650 of FIG. 6 by host processor 110 of FIG. 1. But in other embodiments of the disclosure, computational engine 335 of FIGS. 3A-3D may store partial results where specified by result address 650 of FIG. 6 by host processor 110 of FIG. 1. FIG. 8 illustrates this situation.

FIG. 8 shows result 655 of FIG. 6 broken into parts that may fit in buffer 510 of FIG. 5, according to embodiments of the disclosure. In FIG. 8, computational engine 335 of FIGS. 3A-3D may generate result 655 in parts, such as parts 805-1 through 805-4, which may be referred to collectively as parts 805. For example, part 805-1 of result 655 might be a partial result from processing part 715-1 of FIG. 7 of data 705 of FIG. 7, part 805-2 of result 655 might be a partial result from processing part 715-2 of FIG. 7 of data 705 of FIG. 7, and so on. Computational engine 335 of FIGS. 3A-3D may store each part 805 of result 655 as specified by result address 650 of FIG. 6, as each part 805 of result 655 is generated. Computational engine 335 of FIGS. 3A-3D may track how much data has been written to result address 650 of FIG. 6, so that the next partial result 805 may avoid overwriting prior partial results 805. For example, if each partial result 805 is four bytes, then part 805-1 might be written at return address 650 of FIG. 6 with an offset of zero bytes, part 805-2 might be written at return address 650 of FIG. 6 with an offset of four bytes, and so on. Alternatively, computational engine 335 of FIGS. 3A-3B might write all parts 805 to return address 14 of FIG. 6 without using offsets, leaving it to host processor 110 of FIG. 1 to read data from return address 650 of FIG. 6 as parts 805 are written. In this manner, host processor 110 of FIG. 1 may be able to start using result 655 even before result 655 has been completely generated by computational engine 335 of FIGS. 3A-3D.

Figure 9:
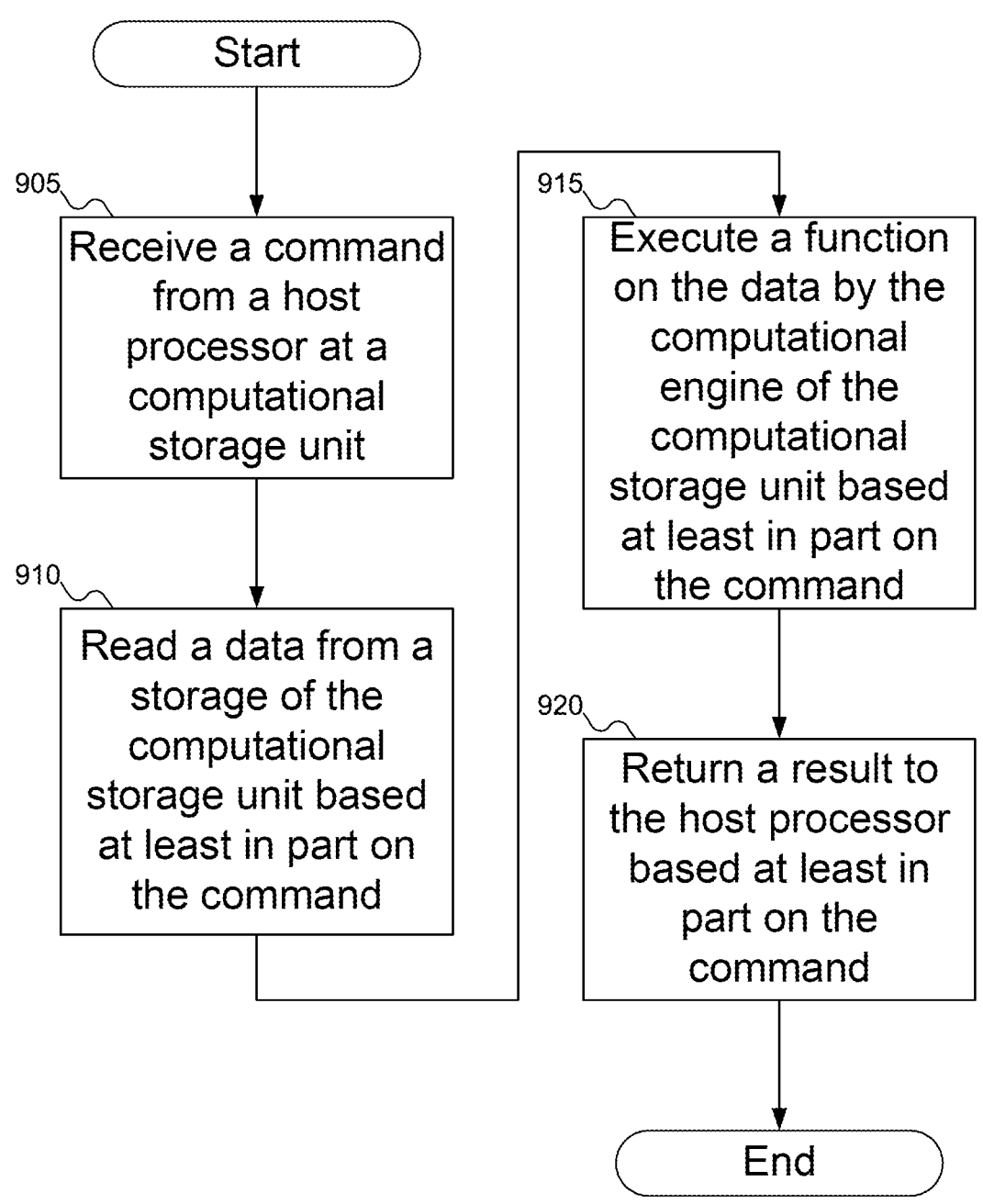
FIG. 9 shows a flowchart of an example procedure for the computational storage unit of FIG. 1 to receive the command of FIG. 6 from the host processor of FIG. 1 and process data, according to embodiments of the disclosure.

FIG. 9 shows a flowchart of an example procedure for computational storage unit 125 of FIG. 1 to receive command 1505 of FIG. 6 from host processor 110 of FIG. 1 and process data, according to embodiments of the disclosure. In FIG. 9, at block 905, computational storage unit 125 of FIG. 1 (and/or storage device 120 of FIG. 1, depending on the implementation), may receive command 625 of FIG. 6 from host processor 110 of FIG. 1. At block 910, in response to command 625 of FIG. 6, storage device 120 of FIG. 1 (and more particularly, controller 315 of FIGS. 3A-3D) may read data 705 of FIG. 7 from flash memory chips 410 of FIG. 4. At block 915, again in response to command 625 of FIG. 6, computational engine 335 of FIGS. 3A-3D may execute a function on data 705 of FIG. 7. Finally, again in response to command 625 of FIG. 6, computational engine 335 of FIGS. 3A-3D may return result 655 of FIG. 6 to host processor 110 of FIG. 1.

FIG. 10 shows a flowchart of an example procedure for computational storage unit 125 of FIG. 1 to read parts of the data and store the parts in buffer 510 of FIG. 5, according to embodiments of the disclosure. In FIG. 10, at block 1005, controller 315 of FIGS. 3A-3D may read part 715 of FIG. 7 of data 705 of FIG. 7 from flash memory chips 410 of FIG. 4. At block 1010, controller 315 of FIGS. 3A-3D may store part 715 of FIG. 7 of data 705 of FIG. 7 in buffer 510 of FIG. 5. Finally, at block 1015, controller 315 of FIGS. 3A-3D may check to see if all parts 715 of FIG. 7 of data 705 of FIG. 7 have been read. If so, then processing completes; otherwise, processing returns to block 1005 to read the next part 715 of FIG. 7 of data 705 of FIG. 7.

Implicit in block 1015 is also that buffer 510 of FIG. 5 has room for the next part 715 of FIG. 7 of data 705 of FIG. 7. If buffer 510 of FIG. 5 does not have room for the next part 715 of FIG. 7 of data 705 of FIG. 7, then controller 315 of FIGS. 3A-3D may pause until there is room in buffer 510 of FIG. 5 for the next part 715 of FIG. 7 of data 705 of FIG. 7.

FIG. 11 shows a flowchart of an example procedure for computational storage unit 125 of FIG. 1 to store a result of the data processing, according to embodiments of the disclosure. In FIG. 1105, computational engine 335 of FIGS. 3A-3D may store result 655 of FIG. 6 in result address 650 of FIG. 6, so that host processor 110 of FIG. 1 may use result 655 of FIG. 6. As discussed above, result address 650 of FIG. 6 may be a register in host processor 110 of FIG. 1, an address in host memory 115 of FIG. 1, or an address (logical or physical) in storage device 120 of FIG. 1.

FIG. 12 shows a flowchart of an example procedure for computational storage unit 125 of FIG. 1 to execute a function on parts of data 705 of FIG. 7 and return parts of result 655 of FIG. 6 to host processor 110 of FIG. 1, according to embodiments of the disclosure. In FIG. 12, at block 1205, computational engine 335 of FIGS. 3A-3D may execute a function on part 715 of FIG. 7 of data 705 of FIG. 7 as stored in buffer 510 of FIG. 5. At block 1210, computational engine 335 of FIGS. 3A-3D may return part 805 of FIG. 8 of result 655 of FIG. 6. As discussed above, returning part 805 of FIG. 8 of result 655 of FIG. 6 to host processor 110 may include storing part 805 of FIG. 8 of result 655 of FIG. 6 in result address 650 of FIG. 6. Finally, at block 1215, computational engine 335 of FIGS. 3A-3D may check to see if all parts 715 of FIG. 7 of data 705 of FIG. 7 have been processed. If so, then processing completes; otherwise, processing returns to block 1205 to process the next part 715 of FIG. 7 of data 705 of FIG. 7.

FIG. 13 shows a flowchart of an example procedure for computational storage unit 125 of FIG. 1 to download a function from host processor 110 of FIG. 1, according to embodiments of the disclosure. In FIG. 13, at block 1305, computational engine 335 of FIGS. 3A-3D may receive command 605 of FIG. 6 to download a function from host processor 110 of FIG. 1. At block 1310, computational engine 335 of FIGS. 3A-3D may download the function. This may involve storing the downloaded function into a program slot of computational engine 335 of FIGS. 3A-3D, or may involve some other form of storing the downloaded function and associating a function identifier with the downloaded function.

In FIGS. 9-13, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

A computational storage device may use additional Dynamic Random Access Memory (DRAM) for the operation to support a computational storage command. This additional DRAM may increase the cost of the device, and may increase the power consumption because of data movement from/to the DRAM.

Data coming from a Solid State Drive (SSD) may be stored in the DRAM. The computation engine reads from the DRAM to perform the computational operation. After completing the computational operation, the result may be stored into the DRAM. Finally, the result of the NVMe command may be transferred to the host.

In embodiments of the disclosure, data coming from the SSD may be stored in the Static Random Access Memory (SRAM) buffer. The computation engine may read the data from the SRAM buffer to perform the computational operation. After completing the operation, the computation engine may transfer the result to the host directly. Embodiments of the disclosure may therefore perform the same computational operations with fewer commands, and may avoid moving data from/to the DRAM (although embodiments of the disclosure may use DRAM in addition to or instead of SRAM).

Embodiments of the disclosure may support a new command format and software interface. Data coming from NAND storage may be stored in internal memory. By avoiding the use of DRAM, embodiments of the disclosure may eliminate the need to use an 'NVMe Read SGL CPM command' to move data to DRAM, thereby eliminating some data transfer operations and saving power.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a computational storage unit, comprising:

a storage for a data;

a controller to read the data from the storage; and a computational engine to implement a function to process the data and generate a result, wherein the computational storage unit is configured to receive a command from a host processor and to read the data from the storage, execute the function to process the data and generate the result, and return the result to the host processor based at least in part on the command.

Statement 2. An embodiment of the disclosure includes the computational storage unit according to statement 1, wherein the storage includes a flash storage.

Statement 3. An embodiment of the disclosure includes the computational storage unit according to statement 1, wherein:

the computational engine includes a buffer; and the controller is configured to read the data from the storage and store the data in the buffer of the computational engine.

Statement 4. An embodiment of the disclosure includes the computational storage unit according to statement 3, wherein the buffer includes a Static Random Access Memory (SRAM).

Statement 5. An embodiment of the disclosure includes the computational storage unit according to statement 1, wherein the computational storage unit does not include a Dynamic Random Access Memory (DRAM).

Statement 6. An embodiment of the disclosure includes the computational storage unit according to statement 1, wherein the command includes a location in the storage where the data is stored.

Statement 7. An embodiment of the disclosure includes the computational storage unit according to statement 6, wherein the command further includes a size of the data in the storage.

Statement 8. An embodiment of the disclosure includes the computational storage unit according to statement 1, wherein the command includes a function identifier of a function to process the data using the computational engine.

Statement 9. An embodiment of the disclosure includes the computational storage unit according to statement 8, wherein the function includes a built-in function of the computational engine or a downloaded function.

Statement 10. An embodiment of the disclosure includes the computational storage unit according to statement 8, wherein the function identifier includes a program slot identifier, the program slot identifier identifying a program slot of the computational engine including the function.

Statement 11. An embodiment of the disclosure includes the computational storage unit according to statement 1, wherein the command includes a location to store the result.

Statement 12. An embodiment of the disclosure includes the computational storage unit according to statement 11, wherein the location includes a register in the host processor or an address in a host memory.

Statement 13. An embodiment of the disclosure includes the computational storage unit according to statement 1, wherein:

the computational engine includes a buffer; and the command includes an address in the buffer of the computational engine where the data is stored.

Statement 14. An embodiment of the disclosure includes the computational storage unit according to statement 1, wherein the computational engine includes a program slot for a downloaded function.

Statement 15. An embodiment of the disclosure includes the computational storage unit according to statement 14, wherein the computational engine is configured to receive the downloaded function from the host processor and to store the downloaded function in the program slot.

Statement 16. An embodiment of the disclosure includes the computational storage unit according to statement 15, wherein the computational engine is configured to receive a second command to download the downloaded function from the host processor.

Statement 17. An embodiment of the disclosure includes the computational storage unit according to statement 16, wherein the second command includes a location where the downloaded function is stored.

Statement 18. An embodiment of the disclosure includes the computational storage unit according to statement 17, wherein the location where the downloaded function is stored includes a register in the host processor or an address in a host memory.

Statement 19. An embodiment of the disclosure includes the computational storage unit according to statement 1, wherein:

the controller is configured to read the data from the storage and deliver the data to the computational engine; and the computational engine is configured to execute the function to process the data, generate the result, and return the result to the host processor.

Statement 20. An embodiment of the disclosure includes the computational storage unit according to statement 1, wherein:

the data includes a first part and a second part;

the controller is configured to read the first part of the data and deliver the first part of the data to the computational engine; and the computational engine is configured to execute the function on the first part of the data, generate a first part of the result, and return the first part of the result to the host processor.

Statement 21. An embodiment of the disclosure includes the computational storage unit according to statement 20, wherein the controller is further configured to read the first part of the data and store the first part of the data in a buffer of the computational engine.

Statement 22. An embodiment of the disclosure includes the computational storage unit according to statement 21, wherein:

the data includes a first size;

the first part of the data includes a second size; and the buffer of the computational engine includes a third size, the third size at least as large as the second size and smaller than the first size.

Statement 23. An embodiment of the disclosure includes the computational storage unit according to statement 20, wherein:

the controller is further configured to read the second part of the data and deliver the second part of the data to the computational engine; and the computational engine is further configured to execute the function on the second part of the data, generate a second part of the result, and return the second part of the result to the host processor.

Statement 24. An embodiment of the disclosure includes the computational storage unit according to statement 23, wherein the controller is further configured to read the second part of the data and deliver the second part of the data to the computational engine based at least in part on the computational engine executing the function on the first part of the data.

Statement 25. An embodiment of the disclosure includes the computational storage unit according to statement 24, wherein the controller is further configured to read the second part of the data and store the second part of the data in a buffer of the computational engine based at least in part on the computational engine executing the function on the first part of the data in the buffer of the computational engine.

Statement 26. An embodiment of the disclosure includes the computational storage unit according to statement 23, wherein the computational engine is further configured to execute the function on the first part of the data before the controller reads the second part of the data and delivers the second part of the data to the computational engine.

Statement 27. An embodiment of the disclosure includes a method, comprising:

receiving a command from a host processor at a computational storage unit;

reading a data from a storage of the computational storage unit based at least in part on the command;

executing a function on the data by a computational engine of the computational storage unit based at least in part on the command; and returning a result to the host processor based at least in part on the command.

Statement 28. An embodiment of the disclosure includes the method according to statement 27, wherein reading the data from the storage of the computational storage unit based at least in part on the command includes reading the data from a flash storage of the computational storage unit based at least in part on the command.

Statement 29. An embodiment of the disclosure includes the method according to statement 27, wherein reading the data from the storage of the computational storage unit based at least in part on the command includes storing the data in a buffer of the computational engine of the computational storage unit based at least in part on the command.

Statement 30. An embodiment of the disclosure includes the method according to statement 29, wherein storing the data in the buffer of the computational engine of the computational storage unit based at least in part on the command includes storing the data in a Static Random Access Memory (SRAM) of the computational engine of the computational storage unit based at least in part on the command.

Statement 31. An embodiment of the disclosure includes the method according to statement 27, wherein the computational storage unit does not include a Dynamic Random Access Memory (DRAM).

Statement 32. An embodiment of the disclosure includes the method according to statement 27, wherein the command includes a location in the storage where the data is stored.

Statement 33. An embodiment of the disclosure includes the method according to statement 32, wherein reading the data from the storage of the computational storage unit based at least in part on the command includes reading the data from the location in the storage of the computational storage unit based at least in part on the command.

Statement 34. An embodiment of the disclosure includes the method according to statement 32, wherein the command further includes a size of the data in the storage.

Statement 35. An embodiment of the disclosure includes the method according to statement 27, wherein the command includes a function identifier of a function to process the data using the computational engine.

Statement 36. An embodiment of the disclosure includes the method according to statement 35, wherein executing the function on the data by the computational engine of the computational storage unit based at least in part on the command includes executing the function identified by the function identifier on the data by the computational engine of the computational storage unit based at least in part on the command.

Statement 37. An embodiment of the disclosure includes the method according to statement 35, wherein the function includes a built-in function of the computational engine or a downloaded function.

Statement 38. An embodiment of the disclosure includes the method according to statement 35, wherein the function identifier includes a program slot identifier, the program slot identifier identifying a program slot of the computational engine of the computational storage unit including the function.

Statement 39. An embodiment of the disclosure includes the method according to statement 38, wherein executing the function on the data by the computational engine of the computational storage unit based at least in part on the command includes executing the function stored in the program slot of the computational engine on the data by the computational engine of the computational storage unit based at least in part on the command.

Statement 40. An embodiment of the disclosure includes the method according to statement 27, wherein the command includes a location to store the result.

Statement 41. An embodiment of the disclosure includes the method according to statement 40, wherein returning the result to the host processor based at least in part on the command includes storing the result in the location by the computational engine of the computational storage unit based at least in part on the command.

Statement 42. An embodiment of the disclosure includes the method according to statement 40, wherein the location includes a register in the host processor or an address in a host memory.

Statement 43. An embodiment of the disclosure includes the method according to statement 27, wherein:

the command includes an address in a buffer of the computational engine; and reading the data from the storage of the computational storage unit based at least in part on the command includes storing the data in the address in the buffer of the computational engine of the computational storage unit based at least in part on the command.

Statement 44. An embodiment of the disclosure includes the method according to statement 27, further comprising downloading a downloaded function to the computational engine of the computational storage unit.

Statement 45. An embodiment of the disclosure includes the method according to statement 44, wherein downloading the downloaded function to the computational engine of the computational engine includes downloading the downloaded function from the host processor to the computational engine of the computational engine.

Statement 46. An embodiment of the disclosure includes the method according to statement 44, wherein downloading the downloaded function to the computational engine of the computational engine includes downloading the downloaded function to a program slot of the computational engine of the computational storage unit.

Statement 47. An embodiment of the disclosure includes the method according to statement 44, wherein downloading the downloaded function to the computational engine of the computational engine includes receiving a second command to download the downloaded function to the computational engine of the computational storage unit.

Statement 48. An embodiment of the disclosure includes the method according to statement 47, wherein the second command includes a location where the downloaded function is stored.

Statement 49. An embodiment of the disclosure includes the method according to statement 48, wherein the location where the downloaded function is stored includes a register in the host processor or an address in a host memory.

Statement 50. An embodiment of the disclosure includes the method according to statement 47, wherein:

the second command includes a program slot identifier identifying a program slot of the computational engine of the computational storage unit; and downloading the downloaded function to the computational engine of the computational engine includes downloading the downloaded function to a program slot of the computational engine of the computational storage unit.

Statement 51. An embodiment of the disclosure includes the method according to statement 27, wherein reading the data from the storage of the computational storage unit based at least in part on the command includes reading the data from the storage of the computational storage unit by a controller of the computational storage unit based at least in part on the command.

Statement 52. An embodiment of the disclosure includes the method according to statement 51, wherein:

the data includes a first part and a second part;

reading the data from the storage of the computational storage unit by the controller of the computational storage unit based at least in part on the command includes reading the first part of the data from the storage of the computational storage unit by the controller of the computational storage unit based at least in part on the command;

executing the function on the data by the computational engine of the computational storage unit based at least in part on the command includes executing the function on the first part of the data by the computational engine of the computational storage unit based at least in part on the command; and returning the result to the host processor based at least in part on the command includes returning a first part of the result to the host processor based at least in part on the command.

Statement 53. An embodiment of the disclosure includes the method according to statement 52, wherein reading the first part of the data from the storage of the computational storage unit by the controller of the computational storage unit based at least in part on the command includes storing the first part of the data in a buffer of the computational engine of the computational storage unit based at least in part on the command.

Statement 54. An embodiment of the disclosure includes the method according to statement 53, wherein:

the data includes a first size;

the first part of the data includes a second size; and the buffer of the computational engine includes a third size, the third size at least as large as the second size and smaller than the first size.

Statement 55. An embodiment of the disclosure includes the method according to statement 52, wherein:

reading the data from the storage of the computational storage unit by the controller of the computational storage unit based at least in part on the command further includes reading the second part of the data from the storage of the computational storage unit by the controller of the computational storage unit based at least in part on the command;

executing the function on the data by the computational engine of the computational storage unit based at least in part on the command further includes executing the function on the second part of the data by the computational engine of the computational storage unit based at least in part on the command; and returning the result to the host processor based at least in part on the command further includes returning a second part of the result to the host processor based at least in part on the command.

Statement 56. An embodiment of the disclosure includes the method according to statement 55, wherein reading the second part of the data from the storage of the computational storage unit by the controller of the computational storage unit based at least in part on the command includes reading the second part of the data from the storage of the computational storage unit by the controller of the computational storage unit based at least in part on executing the function on the first part of the data by the computational engine of the computational storage unit.

Statement 57. An embodiment of the disclosure includes the method according to statement 56, wherein reading the second part of the data from the storage of the computational storage unit by the controller of the computational storage unit based at least in part on the command includes storing the second part of the data in a buffer of the computational engine of the computational storage unit based at least in part on executing the function on the first part of the data in the buffer of the computational engine of the computational storage unit by the computational engine of the computational storage unit.

Statement 58. An embodiment of the disclosure includes the method according to statement 55, wherein executing the function on the first part of the data by the computational engine of the computational storage unit based at least in part on the command includes executing the function on the first part of the data by the computational engine of the computational storage unit based at least in part on the command before reading the second part of the data from the storage of the computational storage unit by the controller of the computational storage unit based at least in part on the command.

Statement 59. An embodiment of the disclosure includes an article, comprising a non-transitory storage medium, the non-transitory storage medium having stored thereon instructions that, when executed by a machine, result in:

receiving a command from a host processor at a computational storage unit;

reading a data from a storage of the computational storage unit based at least in part on the command;

executing a function on the data by a computational engine of the computational storage unit based at least in part on the command; and returning a result to the host processor based at least in part on the command.

Statement 60. An embodiment of the disclosure includes the article according to statement 59, wherein reading the data from the storage of the computational storage unit based at least in part on the command includes reading the data from a flash storage of the computational storage unit based at least in part on the command.

Statement 61. An embodiment of the disclosure includes the article according to statement 59, wherein reading the data from the storage of the computational storage unit based at least in part on the command includes storing the data in a buffer of the computational engine of the computational storage unit based at least in part on the command.

Statement 62. An embodiment of the disclosure includes the article according to statement 61, wherein storing the data in the buffer of the computational engine of the computational storage unit based at least in part on the command includes storing the data in a Static Random Access Memory (SRAM) of the computational engine of the computational storage unit based at least in part on the command.

Statement 63. An embodiment of the disclosure includes the article according to statement 59, wherein the computational storage unit does not include a Dynamic Random Access Memory (DRAM).

Statement 64. An embodiment of the disclosure includes the article according to statement 59, wherein the command includes a location in the storage where the data is stored.

Statement 65. An embodiment of the disclosure includes the article according to statement 64, wherein reading the data from the storage of the computational storage unit based at least in part on the command includes reading the data from the location in the storage of the computational storage unit based at least in part on the command.

Statement 66. An embodiment of the disclosure includes the article according to statement 64, wherein the command further includes a size of the data in the storage.

Statement 67. An embodiment of the disclosure includes the article according to statement 59, wherein the command includes a function identifier of a function to process the data using the computational engine.

Statement 68. An embodiment of the disclosure includes the article according to statement 67, wherein executing the function on the data by the computational engine of the computational storage unit based at least in part on the command includes executing the function identified by the function identifier on the data by the computational engine of the computational storage unit based at least in part on the command.

Statement 69. An embodiment of the disclosure includes the article according to statement 67, wherein the function includes a built-in function of the computational engine or a downloaded function.

Statement 70. An embodiment of the disclosure includes the article according to statement 67, wherein the function identifier includes a program slot identifier, the program slot identifier identifying a program slot of the computational engine of the computational storage unit including the function.

Statement 71. An embodiment of the disclosure includes the article according to statement 70, wherein executing the function on the data by the computational engine of the computational storage unit based at least in part on the command includes executing the function stored in the program slot of the computational engine on the data by the computational engine of the computational storage unit based at least in part on the command.

Statement 72. An embodiment of the disclosure includes the article according to statement 59, wherein the command includes a location to store the result.

Statement 73. An embodiment of the disclosure includes the article according to statement 72, wherein returning the result to the host processor based at least in part on the command includes storing the result in the location by the computational engine of the computational storage unit based at least in part on the command.

Statement 74. An embodiment of the disclosure includes the article according to statement 72, wherein the location includes a register in the host processor or an address in a host memory.

Statement 75. An embodiment of the disclosure includes the article according to statement 59, wherein:

the command includes an address in a buffer of the computational engine; and reading the data from the storage of the computational storage unit based at least in part on the command includes storing the data in the address in the buffer of the computational engine of the computational storage unit based at least in part on the command.

Statement 76. An embodiment of the disclosure includes the article according to statement 59, the non-transitory storage medium having stored thereon further instructions that, when executed by the machine, result in downloading a downloaded function to the computational engine of the computational storage unit.

Statement 77. An embodiment of the disclosure includes the article according to statement 76, wherein downloading the downloaded function to the computational engine of the computational engine includes downloading the downloaded function from the host processor to the computational engine of the computational engine.

Statement 78. An embodiment of the disclosure includes the article according to statement 76, wherein downloading the downloaded function to the computational engine of the computational engine includes downloading the downloaded function to a program slot of the computational engine of the computational storage unit.

Statement 79. An embodiment of the disclosure includes the article according to statement 76, wherein downloading the downloaded function to the computational engine of the computational engine includes receiving a second command to download the downloaded function to the computational engine of the computational storage unit.

Statement 80. An embodiment of the disclosure includes the article according to statement 79, wherein the second command includes a location where the downloaded function is stored.

Statement 81. An embodiment of the disclosure includes the article according to statement 80, wherein the location where the downloaded function is stored includes a register in the host processor or an address in a host memory.

Statement 82. An embodiment of the disclosure includes the article according to statement 79, wherein:

the second command includes a program slot identifier identifying a program slot of the computational engine of the computational storage unit; and downloading the downloaded function to the computational engine of the computational engine includes downloading the downloaded function to a program slot of the computational engine of the computational storage unit.

Statement 83. An embodiment of the disclosure includes the article according to statement 59, wherein reading the data from the storage of the computational storage unit based at least in part on the command includes reading the data from the storage of the computational storage unit by a controller of the computational storage unit based at least in part on the command.

Statement 84. An embodiment of the disclosure includes the article according to statement 83, wherein:

the data includes a first part and a second part;

reading the data from the storage of the computational storage unit by the controller of the computational storage unit based at least in part on the command includes reading the first part of the data from the storage of the computational storage unit by the controller of the computational storage unit based at least in part on the command;

executing the function on the data by the computational engine of the computational storage unit based at least in part on the command includes executing the function on the first part of the data by the computational engine of the computational storage unit based at least in part on the command; and returning the result to the host processor based at least in part on the command includes returning a first part of the result to the host processor based at least in part on the command.

Statement 85. An embodiment of the disclosure includes the article according to statement 84, wherein reading the first part of the data from the storage of the computational storage unit by the controller of the computational storage unit based at least in part on the command includes storing the first part of the data in a buffer of the computational engine of the computational storage unit based at least in part on the command.

Statement 86. An embodiment of the disclosure includes the article according to statement 85, wherein:

the data includes a first size;

the first part of the data includes a second size; and the buffer of the computational engine includes a third size, the third size at least as large as the second size and smaller than the first size.

Statement 87. An embodiment of the disclosure includes the article according to statement 84, wherein:

reading the data from the storage of the computational storage unit by the controller of the computational storage unit based at least in part on the command further includes reading the second part of the data from the storage of the computational storage unit by the controller of the computational storage unit based at least in part on the command;

executing the function on the data by the computational engine of the computational storage unit based at least in part on the command further includes executing the function on the second part of the data by the computational engine of the computational storage unit based at least in part on the command; and returning the result to the host processor based at least in part on the command further includes returning a second part of the result to the host processor based at least in part on the command.

Statement 88. An embodiment of the disclosure includes the article according to statement 87, wherein reading the second part of the data from the storage of the computational storage unit by the controller of the computational storage unit based at least in part on the command includes reading the second part of the data from the storage of the computational storage unit by the controller of the computational storage unit based at least in part on executing the function on the first part of the data by the computational engine of the computational storage unit.

Statement 89. An embodiment of the disclosure includes the article according to statement 88, wherein reading the second part of the data from the storage of the computational storage unit by the controller of the computational storage unit based at least in part on the command includes storing the second part of the data in a buffer of the computational engine of the computational storage unit based at least in part on executing the function on the first part of the data in the buffer of the computational engine of the computational storage unit by the computational engine of the computational storage unit.

Statement 90. An embodiment of the disclosure includes the article according to statement 87, wherein executing the function on the first part of the data by the computational engine of the computational storage unit based at least in part on the command includes executing the function on the first part of the data by the computational engine of the computational storage unit based at least in part on the command before reading the second part of the data from the storage of the computational storage unit by the controller of the computational storage unit based at least in part on the command.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A computational storage unit, comprising:

a storage for a data;

a controller to read the data from the storage; and a computational engine to implement a function to process the data and generate a result, wherein the computational storage unit is configured to receive a single command from a host processor and to serially read the data from the storage, execute the function to process the data and generate the result, and return the result to the host processor based at least in part on the single command, wherein the single command includes an address for the data, a size for the data, an identifier of the function, and a return address where the result is to be stored to return the result to the host processor.

2. The computational storage unit according to claim 1, wherein:

the controller is configured to read the data from the storage and deliver the data to the computational engine; and the computational engine is configured to execute the function to process the data, generate the result, and return the result to the host processor.

3. The computational storage unit according to claim 2, wherein:

the computational engine includes a buffer;

the single command further includes a second identifier of the buffer; and the controller is further configured to read the data from the storage and store the data in the buffer of the computational engine.

4. The computational storage unit according to claim 1, wherein the single command includes a location in the storage where the data is stored.

5. The computational storage unit according to claim 1, wherein the single command includes a location to store the result.

6. The computational storage unit according to claim 1, wherein the computational engine includes a program slot for a downloaded function.

7. The computational storage unit according to claim 1, wherein:

the data includes a first part and a second part;

the controller is configured to read the first part of the data and deliver the first part of the data to the computational engine;

the computational engine is configured to execute the function on the first part of the data, generate a first part of the result, and return the first part of the result to the host processor;

the controller is further configured to read the second part of the data and deliver the second part of the data to the computational engine based at least in part on the computational engine executing the function on the first part of the data; and the computational engine is configured to serially execute the function on the second part of the data, generate a second part of the result, and return the second part of the result to the host processor.

8. A method, comprising:

receiving a single command from a host processor at a computational storage unit;

reading a data from a storage of the computational storage unit based at least in part on the single command;

executing a function on the data by a computational engine of the computational storage unit based at least in part on the single command; and returning a result to the host processor based at least in part on the single command, wherein the single command includes an address for the data, a size for the data, an identifier of the function, and a return address where the result is to be stored to return the result to the host processor.

9. The method according to claim 8, wherein reading the data from the storage of the computational storage unit based at least in part on the single command includes storing the data in a buffer of the computational engine of the computational storage unit based at least in part on the single command.

10. The method according to claim 8, wherein executing the function on the data by the computational engine of the computational storage unit based at least in part on the single command includes executing the function identified by the identifier of the function on the data by the computational engine of the computational storage unit based at least in part on the single command.

11. The method according to claim 8, wherein:

the single command includes a location to store the result; and returning the result to the host processor based at least in part on the single command includes storing the result in the location by the computational engine of the computational storage unit based at least in part on the single command.

12. The method according to claim 8, further comprising downloading a downloaded function to the computational engine of the computational storage unit.

13. The method according to claim 8, wherein reading the data from the storage of the computational storage unit based at least in part on the single command includes reading the data from the storage of the computational storage unit by a controller of the computational storage unit based at least in part on the single command.

14. The method according to claim 13, wherein:

the data includes a first part and a second part;

reading the data from the storage of the computational storage unit by the controller of the computational storage unit based at least in part on the single command includes;

reading the first part of the data from the storage of the computational storage unit by the controller of the computational storage unit based at least in part on the single command; and reading the second part of the data from the storage of the computational storage unit by the controller of the computational storage unit based at least in part on the single command based at least in part on executing the function on the first part of the data by the computational engine of the computational storage unit;

executing the function on the data by the computational engine of the computational storage unit based at least in part on the single command includes:

serially executing the function on the first part of the data by the computational engine of the computational storage unit based at least in part on the single command; and;

serially executing the function on the second part of the data by the computational engine of the computational storage unit based at least in part on the single command;

returning the result to the host processor based at least in part on the single command includes:

returning a first part of the result to the host processor based at least in part on the single command; and returning a second part of the result to the host processor based at least in part on the single command.

15. The method according to claim 8, wherein:

the single command further includes a second identifier of the buffer;

reading the data from the storage of the computational storage unit based at least in part on the single command includes storing the data in the buffer identified by the second identifier; and executing the function on the data by the computational engine of the computational storage unit based at least in part on the single command includes executing the function on the data in the buffer identified by the second identifier by the computational engine of the computational storage unit based at least in part on the single command.

16. An article, comprising a non-transitory storage medium, the non-transitory storage medium having stored thereon instructions that, when executed by a machine, result in:

receiving a single command from a host processor at a computational storage unit;

reading a data from a storage of the computational storage unit based at least in part on the single command;

executing a function on the data by a computational engine of the computational storage unit based at least in part on the single command; and returning a result to the host processor based at least in part on the single command, wherein the single command includes an address for the data, a size for the data, an identifier of the function, and a return address where the result is to be stored to return the result to the host processor.

17. The article according to claim 16, wherein reading the data from the storage of the computational storage unit based at least in part on the single command includes storing the data in a buffer of the computational engine of the computational storage unit based at least in part on the single command.

18. The article according to claim 16, the non-transitory storage medium having stored thereon further instructions that, when executed by the machine, result in downloading a downloaded function to the computational engine of the computational storage unit.

* * * * *